(12) United States Patent
Tanaka et al.

(10) Patent No.: US 9,145,337 B2
(45) Date of Patent: Sep. 29, 2015

(54) FIBER REINFORCED CEMENT BASED MIXED MATERIAL

(71) Applicant: TAISEI CORPORATION, Tokyo (JP)

(72) Inventors: Yoshihiro Tanaka, Hino (JP); Osamu Hashimoto, Tokyo (JP); Jun Sakamoto, Tokyo (JP); Kazuhiko Nishi, Tokyo (JP)

(73) Assignee: TAISEI CORPORATION, Tokyo (JP)

( * ) Notice: Subject to any disclaimer, the term of this patent is extended or adjusted under 35 U.S.C. 154(b) by 0 days.

(21) Appl. No.: 14/359,071

(22) PCT Filed: Nov. 14, 2012

(86) PCT No.: PCT/JP2012/079468
§ 371 (c)(1),
(2) Date: May 16, 2014

(87) PCT Pub. No.: WO2013/073554
PCT Pub. Date: May 23, 2013

(65) Prior Publication Data
US 2014/0326168 A1 Nov. 6, 2014

(30) Foreign Application Priority Data

Nov. 16, 2011 (JP) .................................. 2011-250320
Aug. 21, 2012 (JP) .................................. 2012-182081

(51) Int. Cl.
*C04B 14/48* (2006.01)
*C04B 14/38* (2006.01)
(Continued)

(52) U.S. Cl.
CPC ............... *C04B 28/04* (2013.01); *C04B 20/008* (2013.01); *C04B 20/0048* (2013.01); *C04B 2111/00448* (2013.01); *Y02W 30/92* (2015.05); *Y02W 30/94* (2015.05)

(58) Field of Classification Search
CPC ..................................................... C04B 20/0048
USPC ................................................... 428/399, 400
See application file for complete search history.

(56) References Cited

U.S. PATENT DOCUMENTS 5,302,200 A * 4/1994 Smetana et al. ............... 106/482
5,503,670 A 4/1996 Richard et al.
(Continued)

FOREIGN PATENT DOCUMENTS

JP 8-26793 A 1/1996
JP 8-239249 A 9/1996
(Continued)

*Primary Examiner* — Kaj K Olsen
*Assistant Examiner* — Karam Hijji
(74) *Attorney, Agent, or Firm* — Dickstein Shapiro LLP

(57) ABSTRACT

Provided is a fiber reinforced cement based mixed material having high tensile strength and high toughness, the mixed material comprising a cementitious composition with fast development of early strength; a small hydration heat temperature; and a small shrinkage during curing. The fiber reinforced cement based mixed material contains 100 wt. parts of cement, 5-30 wt. parts of silica fume, 30-80 wt. parts of at least one pozzolanic material excluding the silica fume, 5-25 wt. parts of limestone powder, at least one chemical admixture, water, 70-150 wt. parts of aggregate having a largest aggregate diameter of 1.2-3.5 mm, and fibers, wherein at least some of the fibers comprise a fiber having asperities formed in the surface, the fiber having asperities being formed such that a ratio (h/H) of a depth h of each of recessed portions among the asperities to a smallest cross-sectional diameter H thereof is 0.05-0.8.

8 Claims, 5 Drawing Sheets

(51) Int. Cl.
*C04B 14/00* (2006.01)
*C04B 16/00* (2006.01)
*C04B 22/04* (2006.01)
*C04B 7/00* (2006.01)
*C04B 18/06* (2006.01)
*C04B 28/04* (2006.01)
*C04B 20/00* (2006.01)
*C04B 111/00* (2006.01)

(56) References Cited

U.S. PATENT DOCUMENTS

| | | | |
|---|---|---|---|
| 6,235,108 B1 * | 5/2001 | Lambrechts | 106/644 |
| 6,478,867 B1 | 11/2002 | Cheyrezy et al. | |
| 6,723,162 B1 | 4/2004 | Cheyrezy et al. | |
| 2004/0247846 A1 | 12/2004 | Uzawa et al. | |
| 2008/0163794 A1 | 7/2008 | Tanaka et al. | |
| 2009/0305019 A1 * | 12/2009 | Chanvillard et al. | 428/220 |

FOREIGN PATENT DOCUMENTS

| | | |
|---|---|---|
| JP | 9-500352 A | 1/1997 |
| JP | 11-246255 A | 9/1999 |
| JP | 11-302056 A | 11/1999 |
| JP | 2002-338323 A | 11/2002 |
| JP | 2002-348166 A | 12/2002 |
| JP | 2003-95714 A | 4/2003 |
| JP | 2004-18352 A | 1/2004 |
| JP | 2006-213550 A | 8/2006 |
| JP | 2007-55895 A | 3/2007 |
| JP | 2008-81338 A | 4/2008 |
| JP | 2008-254963 A | 10/2008 |

* cited by examiner

FIBER REINFORCED CEMENT BASED MIXED MATERIAL

TECHNICAL FIELD

The present invention relates to a fiber reinforced cement based mixed material having high strength which is manufactured by mixing fibers into a cementitious composition containing no coarse aggregate.

BACKGROUND ART

Conventional concrete ranges from normal concrete for use in civil engineering and architectural constructions to high-fluidity concrete, high-strength concrete, mass concrete, underwater concrete, etc. depending upon the intended use, and is basically a material intended to be reinforced with reinforcing steel bars. Nowadays, however, there is a trend to employ so-called fiber reinforced concrete (FRC) in which short fibers are incorporated into the conventional concrete for the purpose of supplementing steel bar reinforcement, preventing corner defects of members, and preventing cracking due to drying shrinkage.

The aggregates blended in these concretes are composed of a fine aggregate and a coarse aggregate. In conventional concrete, a unit weight of aggregate contained in a unit volume of concrete is generally greater than a unit weight of powder (=unit weight of cement+unit weight of mineral admixture). For example, the ratio of the unit weight of aggregate to the unit weight of powder is given by 400 to 700% for the most commonly used type of concrete. It is about 250 to 300% even for powder-type high-fluidity concrete containing a large amount of powder.

Moreover, the largest particle diameter of coarse aggregate used in conventional concrete is limited most often to 20 mm or 25 mm in case of applying to general structures, and limited to 40 mm or 80 mm in case of applying to dams and the like. Thus, in conventional fiber reinforced concrete, the bonding mechanism between the fibers and concrete does not rely on mechanical bond through the aggregate mixed in concrete but relies on chemical adhesion and frictional force between cement hydrates (cement paste) and the fibers.

On the other hand, ultra-high-strength fiber reinforced concrete has been known which is obtained by mixing reinforcing fibers such as metallic fibers or organic fibers into a cementitious matrix that is obtained by mixing cement and pozzolanic reaction particles (pozzolanic material) into aggregate having a largest aggregate particle diameter of 1 to 2 mm (see Patent Documents 5 and 6, etc).

Ultra-high-strength fiber reinforced concrete as described above has such a characteristic that it can secure a certain level of tensile strength and toughness even after development of a crack, by combining fibers having high tensile strength with a cementitious matrix being dense and having ultra high strength. Specifically, this has been considered to be due to the exertion of a so-called bridging effect which allows the fibers to cover tensile force for the cementitious matrix when a crack is developed in the cementitious matrix as a result of tensile stress.

For this reason, unlike conventional reinforced concrete, ultra-high-strength fiber reinforced concrete as described above does not require reinforcement with reinforcing steel bars. Moreover, concrete structures built using ultra-high-strength fiber reinforced concrete as described above can achieve reduction in the thickness and the weight of its components.

Moreover, ultra-high-strength fiber reinforced concrete as described above can achieve significant improvement in durability because ultra-high-strength fiber reinforced concrete is often subjected to heat curing (steam curing), and denser hydrated cement particles are developed in a short time through a hydration process compared with normal moist curing. Further, after heat curing, ultra-high-strength fiber reinforced concrete has such characteristics that drying shrinkage becomes almost zero, and a creep coefficient is significantly decreased.

The cementitious compositions disclosed in Patent Document 1 and Patent Document 2 have almost the same mix proportion except the type of cement. These Patent Documents are different in that the type of cement in the cementitious composition is ordinary Portland cement, high-early-strength Portland cement, or moderate-heat Portland cement in Patent Document 1, while it is low-heat Portland cement in Patent Document 2. The cementitious compositions of Patent Documents 1 and 2 are characterized in that the effects of improvement in fluidity, shortening of setting time, improvement in mixing properties, etc. are obtained by blending limestone powder having a specific grading distribution. According to Patent Documents 1 and 2, the improvement in fluidity or mixing properties cannot be achieved only by the adjustment of the fineness (Blaine specific surface area) of limestone powder, but it is indispensable that limestone powder should have a specific grading distribution.

However, the cementitious compositions disclosed in Patent Documents 1 and 2 are cementitious compositions for forming conventional concrete materials, and are not targeted for an ultra-high-strength cementitious matrix of ultra-high-strength fiber reinforced concrete which does not contain coarse aggregate as mentioned above. For this reason, although these cementitious compositions contain Portland cement, silica fume, and limestone powder, the effects of the limestone powder under conditions where a mineral admixture such as a pozzolanic material is blended are neither described nor suggested.

Both Patent Document 3 and Patent Document 4 are the documents on ultra-high-strength fiber reinforced concrete. Fibers contained in the latent hydraulicity composition of Patent Document 3 are organic fibers and carbon fibers, while fibers in Patent Document 4 are metallic fibers. Thus, these Patent Documents are different in terms of fibers, but are common in the cementitious matrix. The cementitious matrices disclosed in these documents are each composed of cement, fine particles, and two kinds of inorganic particles, in which a specific surface area and mix proportions by weight are specified to each of the materials.

Moreover, Patent Documents 3 and 4 each disclose a latent hydraulicity composition developed for the purpose of improving fluidity and segregation resistance, and improving mechanical properties such as compressive strength after curing. With respect to these disclosures, the literatures do not show the improvement in performance based on chemical reaction of materials blended, but describe the performance improvement in fluidity and segregation resistance by paying attention to the grading distribution or Blaine specific surface area of materials. Further, improvement in compressive strength after curing is also described by paying attention to the fact that the constituent materials are mixed by densest packing. These Patent Documents neither describe nor suggest the effects of the cementitious matrix obtained by mixing cement, silica fume, at least one pozzolanic material, and limestone powder on early strength, low shrinkage, low heat of hydration, high fluidity, high tensile strength, high toughness, and etc.

Moreover, Patent Documents 5 to 8 each disclose a composition of a cementitious matrix composed of cement and particles which undergo pozzolanic reaction. Further, metallic fibers, organic fibers, composite fibers obtained by combining organic fibers with metallic fibers, or the like are contained as fibers for reinforcing these cementitious matrices. The ultra-high-strength fiber reinforced concretes disclosed in these documents are characterized in that they allow improvement in fluidity, improvement in segregation resistance, improvement in durability by densifying a cementitious matrix, and improvement in mechanical characteristics after curing. Mixing of pozzolanic reaction particles leads to a state where pozzolanic reaction caused by the presence of cement can be expected, which allows improvement in mechanical properties after curing to be achieved. Moreover, a pozzolanic material also achieves the grading adjustment function of the components of a cementitious matrix composition. Accordingly, improvement in fluidity, improvement in segregation resistance, and densification of a cementitious matrix can be achieved. However, these Patent Documents neither describe nor suggest the effects generated by mixing limestone powder in addition to pozzolanic reaction particles and the achievement of high tensile strength and high toughness by improving the bonding performance between reinforcing fibers and a cementitious matrix.

PRIOR ART DOCUMENTS

Patent Documents

Patent Document 1: Japanese Patent Application Publication No. Hei 8-26793
Patent Document 2: Japanese Patent Application Publication No. Hei 8-239249
Patent Document 3: Japanese Patent Application Publication No. 2002-348166
Patent Document 4: Japanese Patent Application Publication No. 2002-338323
Patent Document 5: Published Japanese Translation of PCT International Application No. Hei 9-500352
Patent Document 6: Japanese Patent Application Publication No. Hei 11-246255
Patent Document 7: Japanese Patent Application Publication No. 2007-55895
Patent Document 8: Japanese Patent Application Publication No. 2006-213550

SUMMARY OF THE INVENTION

Problems to be Solved by the Invention

However, conventional ultra-high-strength fiber reinforced concretes have a large amount of shrinkage during a curing period because of i) a high unit cement content, ii) a small water to (cement+silica fume) ratio (that is, the amount of cement and silica fume used each having a high material cost is large), iii) a small aggregate to powder ratio, etc. The total amount of shrinkage of an ultra-high-strength fiber reinforced concrete material is expressed by the sum of i) autogenous shrinkage and hardening shrinkage caused by hydration reaction occurring in the primary stage of curing, i.e., in the stage from the initiation of setting to the removal of a formwork, and ii) autogenous shrinkage, hardening shrinkage, and drying shrinkage occurring during secondary curing in which heat curing is performed in the period from the removal of a formwork to the generation of final strength. Note that the heat secondary curing is performed at 80° C. to 90° C. for 36 hours to 48 hours i) in order to obtain a predetermined final strength in a short period of time, ii) in order to complete autogenous shrinkage, hardening shrinkage, and drying shrinkage occurring during hydration reaction in an early stage by giving high temperature and sufficient water during the secondary curing to thereby accelerate hydration reaction in a short period of time, and iii) in order to form a dense hydrate structure excellent in durability by performing high temperature heat curing to thereby change capillary pores of the pore structure in a cementitious matrix to gel pores.

When an ultra-high-strength fiber reinforced concrete material is used to manufacture a pre-tensioned member, prestress will be introduced after removing a formwork after primary curing. Here, if autogenous shrinkage and hardening shrinkage occurring during primary curing are large, tensile stress will be generated in a cementitious matrix because a formwork restricts shrinkage. Accordingly, the risk of developing cracks will be increased. In order to avoid this, a measure of relieving the restriction of the formwork is employed. Examples thereof include a method of using, as a formwork material, an easily deformable material such as styrene foam and rubber which can absorb the shrinkage deformation of the concrete material. In this case, such a formwork requires more time and effort in manufacturing than conventional steel or wooden formworks, and the cost is increased by using these expensive materials. Moreover, as for these formwork materials, the efficiency of using the formwork for other purposes is very poor, and a significant increase in the formwork cost poses a large problem.

Further, if autogenous shrinkage, drying shrinkage, hardening shrinkage, etc. occurring during secondary curing are large, the effect of introducing prestress (effective prestress ratio) will be reduced because the prestress is introduced before the secondary curing in the case of manufacturing the pre-tensioned member. That is, if the amount of shrinkage during the secondary curing is large, the introduced tension force will be lost because the structural member shrinks. Since the effective prestress ratio is reduced in this way, it has been required to arrange a tendon in excess allowing for the tension loss.

Meanwhile, it is necessary to add a large amount of chemical admixtures (for example, a high-range water-reducing agent) to conventional ultra-high-strength fiber reinforced concretes since these concretes require a higher fluidity while maintaining a small water-cement ratio. When a large amount of chemical admixture is mixed, there has been a problem that initial setting time is retarded to increase the curing time until a predetermined early strength is developed.

Moreover, in order to reduce the amount of an expensive chemical admixture, such as a high-range water-reducing agent, and to efficiently improve fluidity with a small amount of high-range water-reducing agent, low-heat Portland cement tends to be mixed in conventional ultra-high-strength fiber reinforced concretes. The low-heat Portland cement is prepared by reducing an alite ($C_3S$) component and an aluminate phase ($C_3A$) among the cement components, which are poor in the efficiency for adsorbing a high-range water-reducing agent, and increasing a belite ($C_2S$) component, which is good in the efficiency for adsorbing a high-range water reducing agent. When the low-heat Portland cement is used, the amount of the high-range water reducing agent added can be reduced. However, the reduced content of the alite ($C_3S$) component and the aluminate phase ($C_3A$) which contribute to the development of early strength has resulted in slow development of early strength and long curing time in primary curing.

On the other hand, in the case of a pre-tensioned member, a predetermined strength is required in order to introduce prestress after removal of formworks. The slow development of early strength poses such a problem that the curing time of primary curing to the work steps of removing formworks and introducing prestress is increased to increase the cycle time for manufacturing structural members in which this type of material is used, thus reducing manufacturing efficiency. That is, as a countermeasure for the slow early strength development in a plan in which the quantity of production per day is scheduled, it is necessary to expand capital investment such as the increase in the number of formworks and the extension of a manufacturing line, resulting in the increase in manufacturing cost.

Moreover, this type of material is often subjected to heat secondary curing at 80° C. to 90° C. for 36 hours to 48 hours. As described above, the supply of heat in secondary curing is necessary in the production process. However, in order to maintain high temperature over a long time, a large amount of fuel is required. This also poses a problem of the fuel cost accounting for a high proportion of the manufacturing cost.

A large amount of cement as a binder has been blended in conventional ultra-high-strength fiber reinforced concretes in order to obtain ultra-high compressive and tensile strengths of the cementitious matrix. This has posed a problem that the hydration heat temperature has increased.

One of the common methods of reducing the heat temperature includes a method in which the type of cement to be used is set to low-heat Portland cement. However, using low-heat Portland cement poses a problem of slow development of early strength as mentioned above. Problems of a high hydration heat temperature in the manufacture of members by using this type of ultra-high-strength fiber reinforced concrete will be shown below.

(1) When the heat of hydration is large in the primary stage of curing, a temperature difference will be spatially developed between the inner part of a member and the outside, increasing the risk of development of a temperature crack due to the temperature strain by the temperature difference. The risk of development of a temperature crack will be high particularly in the primary stage of the curing because the strength of the ultra-high-strength fiber reinforced concrete is not sufficiently developed.

(2) When a member has a thick cross section and a thin cross section, a temperature difference is developed between the members by hydration heat to increase the risk of a temperature crack.

(3) The use of this type of material is characterized in that the material can be molded into a member having a thin cross section, but when a large sized structure is planned, a member having a thick cross section may also be required. For example, since a precast block has a thick cross section at a tension end member, the risk of developing a temperature crack is high.

The compressive strength of conventional ultra-high-strength fiber reinforced concretes has shown an allowance and has not posed a problem in many cases in the actual design in which this type of material has been employed. On the other hand, since the advantage of using this type of material as a structural member without reinforcing bars is large, the ultra-high-strength fiber reinforced concrete itself is used as a member required for flexural strength or a member required for flexural toughness. However, the flexural strength and the flexural toughness performance of conventional ultra-high-strength fiber reinforced concretes are limited, and further improvement in performance is desired.

In view of this, an object of the present invention is to provide a fiber reinforced cement based mixed material having high tensile strength and high toughness performance, the mixed material containing a cementitious composition in which the development of early strength is fast; the hydration heat temperature is small; and the amount of shrinkage during curing is small, while keeping the fluidity when concrete is fresh.

Means for Solving the Problems

To achieve the above object, a fiber reinforced cement based mixed material of the present invention comprises 100 parts by weight of cement, 5 to 30 parts by weight of silica fume, 30 to 80 parts by weight of at least one pozzolanic material excluding the silica fume, 5 to 25 parts by weight of limestone powder, at least one chemical admixture, water, 70 to 150 parts by weight of aggregate having a largest aggregate diameter of 1.2 to 3.5 mm, and fibers, wherein at least some of the fibers comprise a fiber having asperities formed in a surface thereof, the fiber being formed such that a ratio (h/H) of a depth h of each of recessed portions among the asperities to a smallest cross-sectional diameter H thereof is 0.05 to 0.8.

Effects of the Invention

The cementitious composition contained in the fiber reinforced cement based mixed material of the present invention formed as described above is characterized in that the amount of shrinkage during curing is small; the development of early strength during primary curing is fast; and the hydration heat temperature caused by hydration reaction is small, while maintaining fresh properties in which fluidity is held.

Moreover, the ultra-high-strength fiber reinforced cement based mixed material obtained by mixing reinforcing fibers with the cementitious composition can have high tensile strength, high flexural strength, and high toughness performance, in addition to compressive strength, while maintaining fresh properties in which fluidity is held.

Further, higher tensile strength and toughness performance can be achieved by forming, in a fiber surface, an asperity pattern suitable for blending aggregate of the cementitious composition.

MODES FOR CARRYING OUT THE INVENTION

Figure 1:
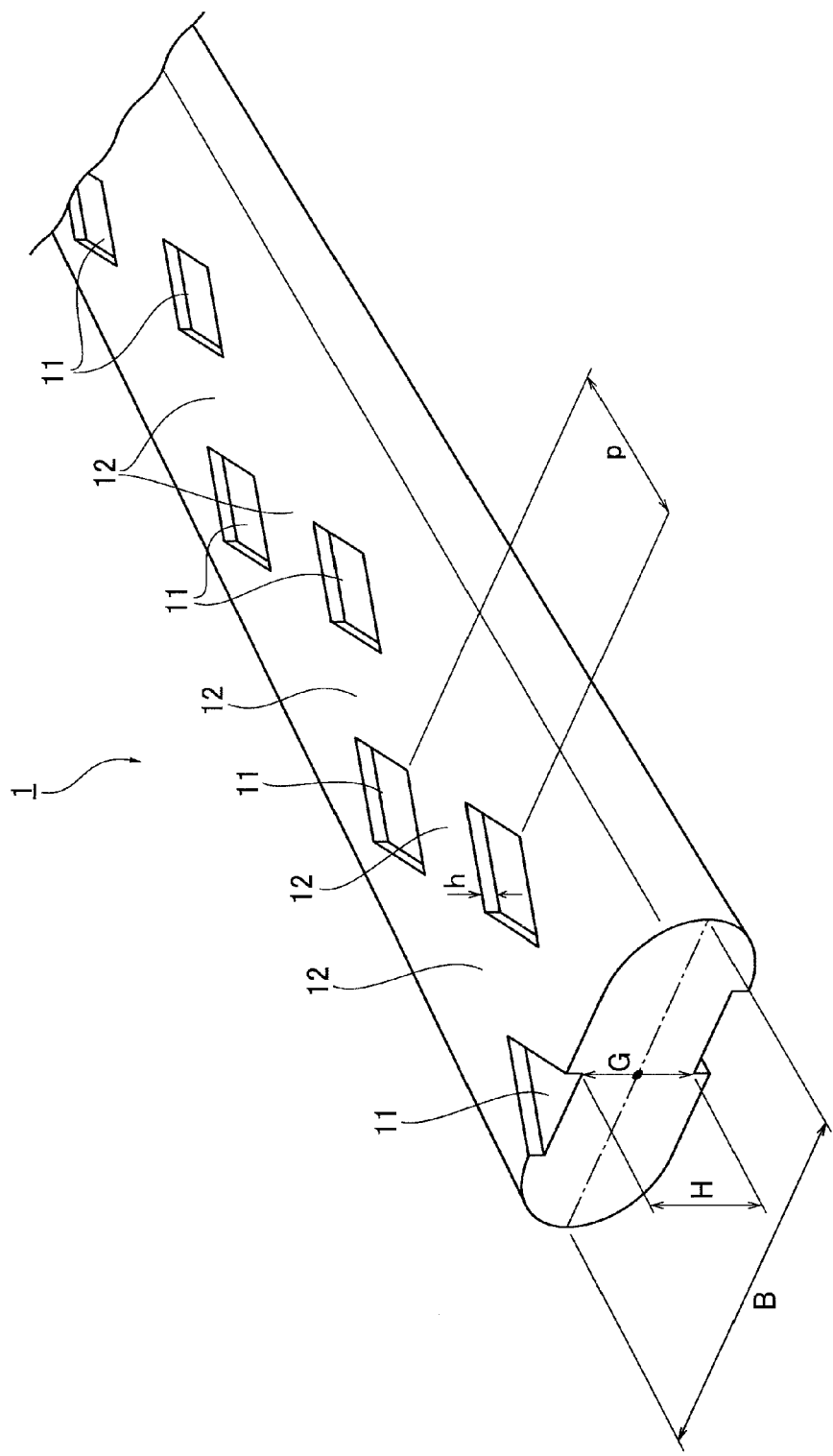
FIG. 1 is a perspective view describing the configuration of a fiber having asperities mixed in a fiber reinforced cement based mixed material of an embodiment of the present invention.

Herein below, embodiments of the present invention will be described. The fiber reinforced cement based mixed material of this embodiment is a fiber reinforced concrete containing a cementitious composition and fibers. Moreover, the cementitious composition is a cementitious matrix containing cement, a mineral admixture, water, a chemical admixture, and aggregate.

First, for the cement, it is possible to use Portland cement (such as ordinary Portland cement, high-early-strength Portland cement, ultra high-early-strength Portland cement, moderate-heat Portland cement, low-heat Portland cement, sulfate-resistant Portland cement, etc).

In particular, when it is desired to obtain the development of early strength at an early stage, use of ordinary Portland cement or high-early-strength Portland cement is preferred. Moreover, when it is desired to improve fluidity or reduce a hydration heat temperature, use of moderate-heat Portland cement or low-heat Portland cement is preferred.

The present cementitious matrix addresses these requirements not only by the type of cement but also by blending silica fume, a pozzolanic material, and limestone powder, as will be described below. That is, silica fume, a pozzolanic material excluding silica fume, and limestone powder are used as the mineral admixture.

The BET specific surface area (specific surface area measured by a BET adsorption method) of silica fume is desirably $10\,m^2/g$ or more. When the BET specific surface area of silica fume is less than $10\,m^2/g$, pozzolanic reaction properties will be reduced, reducing the effect of improving strength performance. Since the particle diameter of silica fume is also increased, the micro-filler effect and the ball bearing effect to be described below will decrease, reducing the effect on fluidity.

Moreover, if the particle diameter of silica fume is increased, the silica fume particles will no longer be sufficiently densest packed in the gap between cement particles. Accordingly, the denseness of the cementitious matrix is reduced, reducing the effect of improving high durability. On the other hand, in the case of silica fume having a BET specific surface area of $10\,m^2/g$ or more, the effect of improvement in strength, fluidity, high durability, etc. can be expected.

Silica fume is an ultrafine particle material obtained by collecting dust in the exhaust gas emitted when silicon metal, ferrosilicon, a silicon alloy, zirconium, etc. are manufactured. The product shape of the silica fume used may be that having a large mass per unit volume obtained by causing mechanical densification for increasing transport efficiency. Moreover, silica fume may also be used in the shape of a silica fume slurry in which silica fume is suspended in water.

The main component of the chemical composition of silica fume is amorphous silicon dioxide ($SiO_2$). Silica fume having a high content of silicon dioxide ($SiO_2$) has high pozzolanic reaction properties. Accordingly, it contributes to the improvement in strength performance and high durability of the cementitious matrix. Moreover, a larger BET specific surface area will increase the pozzolanic reaction properties and contribute to the improvement in strength performances and high durability of the cementitious matrix.

The particle diameter of silica fume is very fine and 1/40 to 1/100 of the diameter of cement particles. Accordingly, a micro-filler effect of filling the pores of the cement hardened body can be expected, and improvement in significant densification of the hardened body structure can be achieved. Since the highly dense structure prevents permeation of chloride ions, carbon dioxide, water, etc., it will be a structure effective in suppressing permeation of chemical substances affecting the durability of concrete, that is, a highly durable structure.

Moreover, silica fume has very fine particle diameter and has a shape close to a sphere. Accordingly, when cementitious matrix is mixed, silica fume is arranged so as to be dispersed in pores between cement particles and pozzolanic material particles. For this reason, the ball bearing effect between these particles can be expected. Then, this ball bearing effect will exhibit the effect on the significant improvement in fluidity of the cementitious matrix.

Silica fume is preferably added in an amount of 5 to 30 parts by weight based on 100 parts by weight of cement. If silica fume is added in an amount of less than 5 parts by weight, the effect of performance improvement such as improvement in strength performance, improvement in high durability, and improvement in fluidity, which silica fume can originally show, will be significantly reduced. Moreover, if silica fume is added in an amount of more than 30 parts by weight, the viscosity of the cementitious matrix will be increased. Accordingly, a predetermined fluidity cannot be obtained. In order to forcibly obtain fluidity, it is necessary to excessively add a high-range water-reducing agent and add water. However, excessive addition of a high-range water-reducing agent not only increases material unit cost, but also retards the development of early strength of the cementitious matrix.

Moreover, if silica fume is blended in an amount of more than 30 parts by weight, autogenous shrinkage and plastic shrinkage will be increased, increasing the risk of crack development. It is generally known that high unit silica fume content results in high autogenous shrinkage, as in the case where high unit cement content results in high autogenous shrinkage. On the other hand, in this cementitious matrix, the unit cement content is set to a low level, and at the same time, the amount of silica fume mixed is set to a low level of 5 to 30 parts by weight based on 100 parts by weight of cement. As a result of reducing the unit silica fume content as described above, the amount of autogenous shrinkage can be reduced. Silica fume is more preferably blended in an amount of 7 to 25 parts by weight based on 100 parts by weight of cement.

Further, the Blaine specific surface area (specific surface area measured by a Blaine air permeability measuring apparatus) of a pozzolanic material to be blended into this cementitious matrix is preferably 2,500 to 20,000 $cm^2/g$. A pozzolanic material refers to a material causing so-called pozzolanic reaction, which contains a large amount of highly reactive silica components, and, when mixed with cement, is cured by an alkali component of cement to develop strength.

The pozzolanic material is classified into a natural pozzolanic material and an artificial pozzolanic material. Any pozzolanic material can be used as a pozzolanic material of this embodiment. As the natural pozzolanic material, it is possible to use: volcanic ash, diatomaceous earth, clay silicate, trass, etc. Further, as the artificial pozzolanic material, it is possible to use: ground granulated blast furnace slag (ground blast furnace slag), ground air-cooled blast furnace slag, fly ash, classified fly ash, coal gasification fly ash, etc. Each of these pozzolanic materials can be used alone or in combination with others. Note that silica fume is known as a material having high pozzolanic reaction properties (or pozzolanic activity) as an artificial pozzolanic material, but it is excluded from the pozzolanic materials as defined here.

The function of the pozzolanic material in this cementitious matrix includes: i) reducing unit cement content by replacing cement by the pozzolanic material, thereby contributing to the reduction in a hydration heat temperature; ii)

accelerating the initial hydration of alite ($C_3S$) in cement, thereby improving the early strength of the cementitious matrix; iii) contributing to the development of long-term strength by pozzolanic reaction; iv) suppressing the initial hydration of an aluminate phase ($C_3A$) in cement, thereby contributing to the reduction in a hydration heat temperature; v) improving the fluidity of the cementitious matrix containing only a small amount of water by the ball bearing effect of the pozzolanic material; and vi) converting the cementitious matrix to a denser structure by the micro-filler effect of the pozzolanic material which fills the cement pores. Here, when the Blaine specific surface area of the pozzolanic material is less than 2,500 $cm^2/g$, the pozzolanic reactivity during the pozzolanic reaction will be reduced, which results in influences such as: i) reduction in the effect of accelerating the initial hydration of alite ($C_3S$) in cement, thereby reducing the effect of improving early strength; ii) reduction in the effect of development of long-term strength by the pozzolanic reaction; and iii) reduction in the effect of suppressing initial hydration of an aluminate phase ($C_3A$) in cement. Moreover, when the Blaine specific surface area of the pozzolanic material is less than 2,500 $cm^2/g$, the pozzolanic material will have a large mean particle diameter. Accordingly, the ball bearing effect and the micro-filler effect are reduced, making it difficult to secure fluidity and denseness. On the other hand, when the Blaine specific surface area of the pozzolanic material excluding silica fume is larger than 20,000 $cm^2/g$, the pozzolanic reaction properties are increased, but a treatment process for classification or grinding classification is required, making it less economical to acquire the material. A more preferred Blaine specific surface area of the pozzolanic material excluding silica fume is 2,500 to 18,000 $cm^2/g$.

Moreover, the content of the pozzolanic material in this cementitious matrix is preferably 30 to 80 parts by weight based on 100 parts by weight of cement. When the content of the pozzolanic material is less than 30 parts by weight, the pozzolanic material cannot sufficiently achieve the function as a pozzolanic material. On the other hand, when the content of the pozzolanic material is more than 80 parts by weight, it is necessary to reduce unit cement content or reduce the amount of aggregate to be blended. Accordingly, a problem arises such as reduction in strength, being unable to ensure fluidity, or increased amount of shrinkage. Therefore, the pozzolanic material is more preferably blended in an amount of 35 to 80 parts by weight based on 100 parts by weight of cement.

At least one pozzolanic material excluding silica fume used in this cementitious matrix is preferably composed of fly ash having a Blaine specific surface area of 2,500 to 18,000 $cm^2/g$ including classified fly ash and a coal gasification fly ash, ground blast furnace slag having a Blaine specific surface area of 3,000 to 12,000 $cm^2/g$, or a combination thereof. These artificial pozzolanic materials have a stable quality as a material, can be easily quality controlled, and can be widely procured as a versatile material.

For example, a long-term development of strength by a latent hydraulicity hydration reaction peculiar to ground blast furnace slag can be expected by blending ground blast furnace slag as an artificial pozzolanic material. Moreover, when ground blast furnace slag is mixed, initial hydration reaction is more active than that when fly ash is blended, and improvement in early strength can be achieved.

Further, limestone powder is used in this cementitious matrix as a mineral admixture. The limestone powder is a mineral admixture, but does not undergo pozzolanic reaction. Accordingly, it is not a pozzolanic reaction particle (pozzolanic material). That is, in this cementitious matrix, unit cement content is reduced by blending silica fume, a pozzolanic material excluding silica fume, and limestone powder as mineral admixtures, in addition to cement. The blending of the mineral admixtures covers the loss such as the reduction in strength and the retardation of development of early strength caused by reduction in the unit cement content and contributes to the reduction in hydration heat.

Particularly, by blending limestone powder which does not undergo pozzolanic reaction in addition to a pozzolanic material, this cementitious matrix can obtain better shrinkage reduction effect than that obtained by blending only the pozzolanic material. This is because i) the amount of cement to be blended is replaced by limestone powder to thereby reduce the unit cement content, thereby capable of reducing the total shrinkage; and ii) the amount of a pozzolanic material to be blended is replaced by limestone powder, thereby capable of reducing the total shrinkage because the limestone powder has a smaller shrinkage than the shrinkage due to pozzolanic reaction.

Incidentally, in order to cause early strength to develop at an early stage, it is considered to change the type of cement, for example, change the type of Portland cement to be used to high-early-strength Portland cement. However, the use of high-early-strength Portland cement will pose a problem of increase in the amount of shrinkage and a hydration heat temperature because it contains a large amount of alite ($C_3S$) and aluminate phase ($C_3A$) as its mineral phases.

In this respect, this cementitious matrix has enabled the development of early strength at an early stage without increasing the amount of shrinkage and a hydration heat temperature by blending limestone powder in an amount of 5 to 25 parts by weight based on 100 parts by weight of cement, even if the type of cement is not changed to high-early-strength Portland cement. Such an effect is obtained probably because i) the limestone powder accelerates the initial hydration of alite ($C_3S$) in cement to improve the early strength of the cementitious matrix, and ii) the limestone powder reacts with calcium aluminate ($C_3A$) in cement to produce a hydrate such as monocarbo-aluminate ($C_3ACaCO_3 \cdot 11H_2O$) and contributes to the development of early strength.

Here, since ground blast furnace slag and fly ash as pozzolanic materials can also accelerate the initial hydration of alite ($C_3S$) in cement and can improve the early strength of the cementitious matrix, these pozzolanic materials are blended in this cementitious matrix. However, since limestone powder has a larger effect on the development of early strength than ground blast furnace slag and fly ash, it is possible to efficiently develop early strength by blending limestone powder.

On the other hand, although limestone powder exerts an effect on the development of early strength, an effect thereof on long-term strength cannot be expected. For this reason, fly ash is blended as a pozzolanic material, thereby capable of expecting a pozzolanic reaction by which strength is developed on a long-term basis, and capable of achieving an improvement in long-term strength by the pozzolanic reaction in secondary curing. Alternatively, ground blast furnace slag is blended, thereby capable of expecting its latent hydraulicity hydration reaction and achieving improvement in long-term strength after secondary curing.

Moreover, initial hydration of an aluminate phase ($C_3A$) which generates the largest heat in the mineral phases of cement can be suppressed by blending fly ash or ground blast furnace slag as a pozzolanic material. Although this effect is lower than that of limestone powder, reduction in the hydration heat temperature can be achieved without changing the type of cement. Further, the early strength can be developed at an early stage.

This cementitious matrix has low unit cement content as mentioned above. Accordingly, it is possible to obtain an effect of reduction in the hydration heat temperature due to the reduction in the amount of hydration reaction of the cement. Then, in order to prevent strength properties, such as compressive strength and tensile strength, from being reduced even if the unit cement content decreases, limestone powder having a Blaine specific surface area of 3,000 to 18,000 cm$^2$/g is blended in an amount of 5 to 25 parts by weight based on 100 parts by weight of cement in addition to a pozzolanic material. In this way, further improvement in an effect can be achieved as compared with the effect on the reduction in the heat of hydration obtained by blending only the pozzolanic material. This is because i) the amount of cement to be blended can be replaced by limestone powder, thereby capable of further reducing the unit cement content to reduce the hydration heat temperature; and ii) the amount of a pozzolanic material to be blended can be replaced by limestone powder, thereby capable of reducing the total heat generation by the replacement to the limestone powder which has a lower heat temperature than the heat of pozzolanic reaction.

Incidentally, the data (entropy) with respect to the hydration heat of mineral phases of cement is shown as follows: aluminate phase ($C_3A$)=8.41 (cal/mol deg), ferrite phase ($C_3AF$)=6.31 (cal/mol deg), alite ($C_3S$)=1.8 (cal/mol deg), and belite ($C_2S$)=1.5 (cal/mol deg). These data shows that the suppression of hydration of an aluminate phase ($C_3A$) is efficient.

In this cementitious matrix, limestone powder can more efficiently suppress the initial hydration of an aluminate phase ($C_3A$) having the largest heat temperature in the mineral phases of cement than a pozzolanic material. Accordingly, reduction in the hydration heat temperature can be effectively achieved. Therefore, reduction in hydration heat temperature can be achieved without changing the type of cement, for example, changing cement to low-heat Portland cement. Moreover, early strength can be developed at an early stage in the state where the initial hydration heat temperature is reduced.

Thus, an efficient effect can be obtained for the reduction in the amount of shrinkage, development of early strength at an early stage, reduction in hydration heat temperature, etc. by mixing limestone powder in the cementitious matrix. Further, the limestone powder can provide an effect also for the improvement in fluidity of the cementitious matrix and the fiber reinforced cement based mixed material manufactured using the same.

Here, it is considered that the water-reducing effect by a high-range water-reducing agent (for example, polycarboxylic acid-based one, etc.) to be described below is the dispersion function by the "steric hindrance effect" of polymer of the water-reducing agent adsorbed to powder. According to measurement of the amount of adsorption, limestone powder has better dispersion performance than cement, ground blast furnace slag, etc., and a high dispersion effect can be obtained by using the limestone powder, even if the content of the high-range water reducing agent is small.

Moreover, since the particle diameter of limestone powder is smaller than that of a cement particle, the limestone powder has a micro-filler effect of filling cement pores, similar to silica fume or pozzolanic materials, such as fly ash or ground blast furnace slag. It is said that limestone powder is the best material for densest packing. The limestone powder has a particle shape close to a sphere, and, by its ball bearing effect, can more efficiently achieve improvement in fluidity than fly ash and ground blast furnace slag in the presence of a small amount of water and high-range water-reducing agent.

When the Blaine specific surface area of limestone powder is less than 3,000 cm$^2$/g, the activity as limestone powder is reduced. Accordingly, a shrinkage reduction effect, the effect of achieving early strength, the effect of reduction in hydration heat temperature, etc. cannot be expected. Further, since the micro-filler effect of filling cement pores and the ball bearing effect cannot be sufficiently expected, the improvement in fluidity cannot be expected. On the other hand, if the Blaine specific surface area of limestone powder is larger than 18,000 cm$^2$/g, the activity as limestone powder is improved, so the above effects may be satisfied. However, treatment equipment for classification or grinding classification for manufacturing limestone powder having a high Blaine specific surface area is required, making it less economical to acquire the material. The limestone powder more preferably has a Blaine specific surface area of 4,000 to 15,000 cm$^2$/g.

When the content of the limestone powder is less than 5 parts by weight based on 100 parts by weight of cement, the effects expected from the limestone powder, such as reduction in shrinkage, early strength, and reduction in a hydration heat temperature, cannot sufficiently be expected. Five parts by weight or more of limestone powder are required for the reduction in the initial shrinkage that is particularly important. On the other hand, when the content of the limestone powder is higher than 25 parts by weight, the blending ratio of a pozzolanic material and silica fume may be reduced to significantly reduce fluidity if unit cement content is not changed. Conversely, if the blending ratio of a pozzolanic material and silica fume is not changed, it is necessary to reduce the unit cement content, which results in the reduction in strength properties. The content of the limestone powder is more preferably 8 to 20 parts by weight based on 100 parts by weight of cement.

The chemical admixture to be blended into this cementitious matrix is an additive agent used for a variety of purposes such as improving fluidity and strength development, setting control, and improving durability, and at least one kind is used. For this chemical admixture, it is possible to use a high-range water-reducing agent, an air-entraining and high-range water-reducing agent, a plasticizing agent, an antifoaming agent, a setting accelerating agent, a setting retarding agent, a thickening agent, a shrinkage reducing agent, a quick setting agent, a foaming agent, a rust-preventive agent, etc., either alone or in combination with others.

A high-range water-reducing agent or an air-entraining and high-range water-reducing agent is used for aiming at improving fluidity by a small unit water content. Examples of the high-range water-reducing agent include a polycarboxylate-based high-range water-reducing agent, a polyalkylallyl sulfonate-based high-range water-reducing agent, an aromatic aminosulfonate-based high-range water-reducing agent, and a melamine formalin resin sulfonate-based high-range water-reducing agent. Examples of the air-entraining and high-range water-reducing agent include an alkylallyl sulfonate-based air-entraining and high-range water-reducing agent, an aromatic aminosulfonate-based air-entraining and high-range water-reducing agent, a melamine formalin resin sulfonate-based air-entraining and high-range water-reducing agent, and a polycarboxylate-based air-entraining and high-range water-reducing agent. The amount of the high-range water-reducing agent used that can provide good fluidity is, but not limited to, 3 to 5 parts by weight based on 100 parts by weight of cement. A defoaming agent may be used in combination with the high-range water-reducing agent in order to defoam air entrained during mixing.

The water blended into this cementitious matrix is not limited as long as it does not contain impurities, such as city water. The amount of water used that can provide good fluidity and strength properties depends on a high-range water-reducing agent or an air-entraining and high-range water-reducing agent to be used, or unit cement content, but may be 21 to 26 parts by weight based on 100 parts by weight of cement.

For the aggregate blended into this cementitious matrix, it is possible to use river sand, sea sand, silica sand, crushed sand, crushed sand of limestone, sand of a recycled aggregate, crushed sand of fired bauxite, crushed sand of an iron ore, crushed sand of quartz-porphyrite, crushed sand of blast furnace slag, fine quartz powder, fine silica stone powder, fine rock powder, etc., either alone or in combination with others.

In this cementitious matrix, aggregate having a largest particle diameter Dmax of the aggregate, that is, a largest aggregate particle diameter, of 1.2 to 3.5 mm is blended in an amount of 70 to 150 parts by weight based on 100 parts by weight of cement. The aggregate content of this cementitious matrix is higher by about 30 to 50 parts by weight than that of conventional ultra-high-strength fiber reinforced concretes. A firm skeleton of aggregate is formed in the cementitious matrix by mixing into the cementitious matrix a large amount of aggregate having a largest aggregate diameter larger than the largest aggregate diameter shown in Patent Documents 5 to 7. Such a skeleton of aggregate acts as a skeleton of shrinkage resistance not locally but macroscopically spatially against the shrinkage such as autogenous shrinkage or hardening shrinkage, or drying shrinkage. As a result, the amount of shrinkage can be reduced without developing cracks caused by shrinkage.

If the largest aggregate diameter is set to less than 1.2 mm, the skeleton of aggregate for reducing the shrinkage of the cementitious matrix will not sufficiently be formed, reducing the effect of suppressing the shrinkage. On the other hand, if the largest aggregate diameter is set to more than 3.5 mm, the boundary area between the surface of aggregate and cement paste will be increased. Accordingly, the proportion of reduction in peel strength or bond strength in this boundary part will be increased relative to that of the whole cementitious matrix. As a result, the flexural strength or tensile strength of the cementitious matrix is significantly reduced. A more preferred largest aggregate diameter is 1.5 to 3.0 mm.

The content of aggregate having a largest aggregate diameter of 1.2 to 3.5 mm is preferably 70 to 150 parts by weight based on 100 parts by weight of cement. If the content of the aggregate is less than 70 parts by weight, the content of powder will relatively increase to thereby reduce the skeleton of the aggregate. This poses a problem of the increase in the amount of shrinkage, the increase in viscosity caused by excessively high powder content, the necessity for the excess high-range water-reducing agent for reducing viscosity, the increase in cement hydration heat, the reduction in shear transmission force between cementitious matrices due to the reduction in the amount of aggregate, etc. On the other hand, if the content of the aggregate is more than 150 parts by weight, the content of powder will be relatively reduced, providing a sufficient effect of reducing shrinkage. However, reduction in compressive strength, flexural strength, tensile strength, etc. caused by the reduction in a binder will occur.

The cementitious matrix of this embodiment formed as described above is characterized in that the amount of shrinkage during curing is small; the development of early strength during primary curing is fast; and the hydration heat temperature caused by hydration reaction is small, while maintaining fresh properties in which fluidity is held. Moreover, since the amount of shrinkage can be reduced also in secondary curing, the estimate of tension loss of a pre-tensioned member can be reduced, and the cost of a tendon and the arrangement time and effort of the tendon can be saved.

Further, it is possible to reduce the unit cement content of this cementitious matrix, and the unit cement content can be reduced by at least about 100 to 250 kg/m$^3$ as compared with the unit cement content of conventional ultra-high-strength fiber reinforced concretes.

Moreover, when the blended weight of silica fume is 5 to 30 parts by weight based on 100 parts by weight of cement, the content of silica fume is an amount that is lower than that in conventional materials. That is, a large amount of cement is used and a large amount of expensive raw materials such as silica fume are used in a cementitious matrix forming conventional ultra-high-strength fiber reinforced concretes. As a result, a strength such as ultra-high compressive strength and tensile strength has been obtained, and a highly dense and highly durable material has been achieved. However, silica fume has the highest material unit cost, which is one of the reasons why conventional ultra-high-strength fiber reinforced concretes have been very expensive materials.

Therefore, if the amount of the silica fume used can be reduced, an economical material will be easily obtained. In this cementitious matrix, even if the amount of silica fume incorporated is reduced, limestone powder and pozzolanic materials each having a specified Blaine specific surface area are blended in specified mix proportions, in addition to silica fume. This allows the reduction in the amount of shrinkage, the development of early strength at an early stage, and the reduction in heat of hydration. For such a reason, the material cost of this cementitious matrix can be reduced.

The ultra-high-strength fiber reinforced cement based mixed material (ultra-high-strength fiber reinforced concrete) of this embodiment is obtained by mixing either metallic fibers, organic fibers, or composite (hybrid) fibers in which organic fibers and metallic fibers are mixed, into the cementitious matrix as described above. That is, the fiber reinforced cement based mixed material of this embodiment is not dependent on the material of fibers to be mixed.

With respect to the shape of a fiber, the fiber preferably has a ratio (Li/d) of the length Li to the mean cross-sectional diameter d of 10 to 500. The ratio (Li/d) is a parameter which is called aspect ratio AR and shows the bonding performance between fibers and a cementitious matrix. When the aspect ratio AR is less than 10, it is difficult to sufficiently obtain bonding between a cementitious matrix and fibers, and it becomes impossible to maintain the tensile reinforcement by fibers. On the other hand, when the aspect ratio AR is larger than 500, the length of fibers may be too long. Accordingly, when these fibers are mixed into a cementitious matrix, the fibers will be entangled to be liable to form a fiber ball. In addition, the fibers cannot be uniformly dispersed in a cementitious matrix, and fluidity is also lost. More preferably, the aspect ratio AR is set to 20 to 300.

Examples of the metallic fibers which can be mixed include steel fibers, high-strength steel fibers, stainless steel fibers, titanium fibers, and aluminum fibers. Moreover, for organic fibers, it is possible to use: polypropylene (PP) fibers, polyvinyl alcoholic (PVA) fibers, aramid fibers, polyethylene fibers, ultra-high-strength polyethylene fibers, polyethylene terephthalate (PET) fibers, rayon fibers, nylon fibers, polyvinyl chloride fibers, polyester fibers, acrylic fibers, anti-alkali glass fibers, etc.

Further, it is also possible to use composite fibers in which organic fibers are mixed with metallic fibers. An advantage of using composite fibers is the tensile reinforcement by metallic fibers having high rigidity and tensile strength. The reinforcing effect of metallic fibers can be greatly expected in a region where tensile strain is small (for example, in the state where the width of a crack immediately after development of the crack is small). On the other hand, tensile reinforcement effect by organic fibers can be greatly expected in the region where the width of a crack is increased and tensile strain is large. As described above, fiber reinforcement effect can be effectively expected in a wide region of tensile strain by using composite fibers.

In order to improve the tensile strength and toughness (or fracture energy) of ultra-high-strength fiber reinforced concrete of this embodiment, a cementitious matrix and the surface shape of fibers to be mixed can be specified. That is, when specifying the components of the cementitious matrix and the blended weight of each component, it is an important point that, particularly for improving tensile strength and toughness, the amount of aggregate is specified to be 70 to 150 parts by weight based on 100 parts by weight of cement. Moreover, an asperity pattern is formed in a surface of at least some of the fibers mixed in the cementitious matrix, forming a fiber having asperities, such that a ratio (=h/H) of a depth h of each of recessed portions among the asperities of the fiber to a smallest cross-sectional diameter H thereof is 0.05 to 0.8 (see FIG. 1).

Here, the mean particle diameter $\phi_A$ of the aggregate blended into the ultra-high-strength fiber reinforced concrete is preferably 0.2 to 0.8 mm. Note that the mean particle diameter $\phi_A$ of the aggregate is a particle size (diameter) in a particle-diameter accumulation curve of the aggregate at a weight ratio of 50% in weight percent passing (or passage ratio) and corresponds to what is called a mean particle diameter $D_{50}$. In addition, a pitch p of the recessed portions among the asperities in the longitudinal direction of the fiber in which the asperity pattern is formed (the distance between a recessed portion and its adjacent recessed portion in the longitudinal direction) is preferably formed such that a ratio (=p/B) of the pitch p to the largest cross-sectional diameter B of the fiber is 0.3 to 10.0 (see FIG. 1).

The cross-sectional shape of the fibers may be any shape such as the flat elliptical shape shown in FIG. 1, a circular shape, or a rectangular shape. Here, if the area of the cross section is the same, circular cross sections have the smallest bonding area. In contrast, if the area of the cross section is the same, flat cross sections have larger bonding areas than circular cross sections. For this reason, flat elliptical cross sections and rectangular cross sections are advantageous in terms of bonding.

Moreover, the total volume of the fibers to be mixed (the volume of the mixed fibers) is preferably adjusted such that the ratio of the volume of the mixed fibers to the total volume of the ultra-high-strength fiber reinforced concrete (volume mixing ratio) is 0.7 to 8%. That is, if the volume mixing ratio of fibers is 0.7%, the amount is large enough to expect, though small, a fiber bridging effect for the ultra-high-strength fiber reinforced concrete. However, while a volume mixing ratio of 8% is an amount with which a sufficient fiber bridging effect can be expected, mixing an amount of fibers equal to or greater than this in the cementitious matrix makes it impossible to maintain fresh properties in the mixed state and thereby makes self-leveling difficult. This leads to a possibility that the ultra-high-strength fiber reinforced concrete cannot be practically used as a structural material. The total amount of the fibers to be mixed can be more preferably such that the volume mixing ratio is 1.0 to 5.5%.

Further, at least some of the fibers mixed in the ultra-high-strength fiber reinforced concrete is a fiber 1 having asperities formed in its surface as shown in FIG. 1. This fiber having asperities 1 has multiple recessed portions 11, . . . disposed in the fiber surface in a staggered arrangement with a gap therebetween, and a raised portion 12 is between the recessed portions 11, 11. This asperity pattern can be formed by, for example, embossing the fiber surface. Note that the raised portion 12 only needs to protrude from the bottom surfaces of its recessed portions 11; hence, regardless of whether the portion between the recessed portions 11, 11 is flat or raised in a dome shape, it is the raised portion 12.

Figure 2:
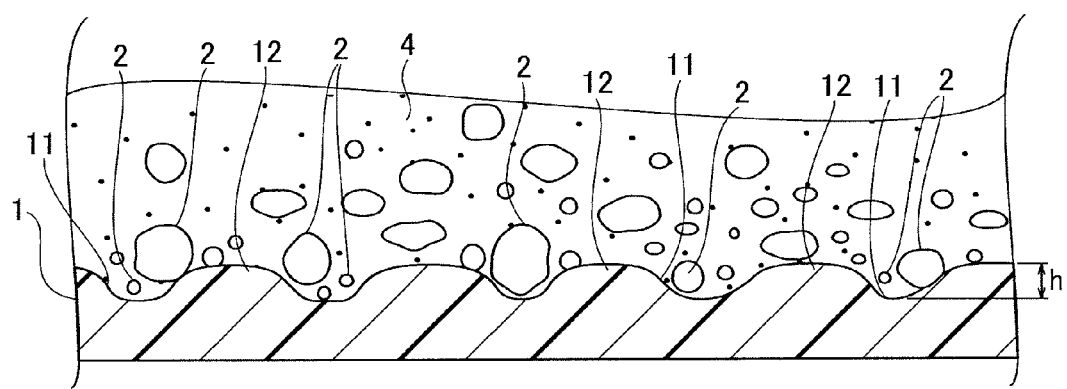
FIG. 2 is an explanatory diagram describing mechanical bond between the fiber having asperities and the aggregate.

In this embodiment, each recessed portion 11 is formed in a rhombic shape in a plan view having a depth h. Here, the depth h of the recessed portion 11 is the distance from the highest point of its raised portions 12 to the lowest point (bottom surface) of the recessed portion 11 as shown in FIG. 2. Moreover, as shown in FIG. 1, assuming that the center of gravity of a cross section of the fiber having asperities 1 is G, a largest cross-sectional diameter B is the largest diameter passing through the center of gravity G, and a smallest cross-sectional diameter H is the smallest diameter passing through the center of gravity G. Note that in the case where recessed portions 11 are present in the cross section, the smallest cross-sectional diameter H is measured by assuming the bottom surface of each recessed portion 11 as the outer peripheral surface as shown in FIG. 1.

Now, a mechanism that increases the bonding force of the ultra-high-strength fiber reinforced concrete of this embodiment will be described with reference to FIG. 2. FIG. 2 is a view schematically illustrating an enlarged cross section of the upper half of a fiber having asperities 1, as well as aggregate 2, . . . , and a cement hydrate 4 contained in a cementitious matrix. As shown in FIG. 2, the aggregate 2, . . . is dispersed within the cementitious matrix formed along the recessed portions 11 and the raised portions 12 of the fiber having asperities 1. Some of the aggregate 2, . . . is inside the recessed portions 11 of the fiber having asperities 1.

Now, when cracking or the like occurs in a structure built with the ultra-high-strength fiber reinforced concrete, thereby causing a bridging effect and therefore exerting tensile force on the fiber having asperities 1, the cementitious matrix containing the aggregate 2, . . . filled in the recessed portions 11 serve as anchors against the fiber having asperities 1. On the other hand, the raised portions 12 between the recessed portions 11, 11 in the fiber having asperities 1 serve as anchors against the cementitious matrix.

As described above, the cementitious matrix of the ultra-high-strength fiber reinforced concrete of this embodiment contains the aggregate 2, . . . of appropriate sizes by an appropriate amount. Hence, the mutual shear transfer resistance inside the cementitious matrix is increased by the engagement of the aggregate 2, . . . as compared to conventional ultra-high-strength fiber reinforced concretes.

In addition to that, some of the aggregate 2, . . . contained in the above-mentioned anchor formed by the cementitious matrix engage with the recessed portions 11 of the fiber having asperities 1 as shown in FIG. 2. Thus, it is possible to exert high slip rigidity and high slip shear resisting force against slip shear force generated around the recessed portions 11 due to the bridging effect of the fiber having asperities 1.

The main reason for this may be considered to be that the blended aggregate is generally high in elastic modulus and compressive strength and therefore can be expected to have high slip rigidity and high slip shear resisting force, as compared to the cement hydrate 4 in the cementitious matrix without the aggregate therein.

The amount of aggregate mixed is preferably 70 to 150 parts by weight based on 100 parts by weight of cement. As mentioned above, the parts by weight of aggregate need to be specified also from the point of view of reduction in the amount of shrinkage, insuring fluidity, reduction in the heat of hydration, shear transmission force between cementitious matrices, improvement in strength properties such as compressive strength, etc. Furthermore, the parts by weight of aggregate specified as shown here have an important meaning because when at least some of the fibers mixed in the cementitious matrix are fibers having asperities 1 formed in a surface thereof as shown in FIG. 1, a mutual synergy can be exhibited if the parts by weight are within the above specified numerical value range.

To describe this with reference to FIG. 2, if the amount of aggregate mixed is below 70 parts by weight of aggregate, the amount of the aggregate 2 contained in the cementitious matrix in the recessed portions 11 of the fiber having asperities 1 is too small, thereby reducing the probability of the aggregate 2 engaging with the recessed portions 11. As a result, it becomes impossible to expect high slip rigidity and high slip shear resisting force against slip shear force generated around the recessed portions 11. On the other hand, if the amount of aggregate mixed is over 150 parts by weight of aggregate, powder material (=cement+mineral admixture) (binding material) in the cementitious matrix is greatly reduced, and therefore it is difficult to achieve necessary mechanical characteristic values, such as compressive strength and tensile strength, of the ultra-high-strength fiber reinforced concrete itself. That is, the proportion of the cementitious matrix surrounding the aggregate 2 decreases. Thus, even if the aggregate 2 is hooked on the recessed portions 11, the surrounding cement hydrate 4 cannot sufficiently transfer slipping force from the aggregate 2. As a consequence, it becomes impossible to expect high slip rigidity and high slip shear resistance. The mixing amount of the aggregate is more preferably 75 to 145 parts by weight.

For the depth h of each recessed portion 11 of the fiber having asperities 1, the ratio h/H thereof to the smallest cross-sectional diameter H of the fiber having asperities 1 is set as a parameter, by taking into account the bonding interaction between the aggregate 2 in the cementitious matrix and the fiber having asperities 1. Reducing the ratio h/H reduces the depth h of the recessed portion 11 and thereby imparts a decreasing tendency to the mechanical bond.

On the other hand, increasing the ratio h/H increases the mechanical bond but increases the size of the loss of the fiber having asperities 1 in its cross sections. This reduces the tensile strength of the fiber having asperities 1 itself and the rigidity of the fiber. Thus, it is possible that the risk of the fiber having asperities 1 breaking before slip shear fracture of the cementitious matrix may be increased, and that the reduced tensile rigidity of the fiber may increase the width of cracks. Moreover, when the ratio h/H is increased, the fluidity of the ultra-high-strength fiber reinforced concrete tends to be reduced when the fiber having asperities 1 is mixed into the cementitious matrix.

In this respect, the ratio h/H is set within the range of 0.05 to 0.8. In this way, a significant improvement can be expected in the mechanical bond produced by an appropriate amount of aggregate engaging with the recessed portions and the raised portions of the fiber having asperities 1. Moreover, the possibility of breakage of the fiber, decrease in the rigidity of the fiber, or reduction in the fluidity can be minimized.

If the ratio h/H is below 0.05, the relative depth of the recessed portion 11 in the fiber having asperities 1 is small. For this reason, even in the case of a combination in which the mean particle diameter $\phi_A$ of the aggregate 2 is small, the aggregate 2 in the recessed portions 11 of the fiber having asperities 1 is too large, thus reducing the probability of valid engagement between the aggregate 2 and the recessed portions 11. High slip shear rigidity and high slip shear resistance cannot be expected. On the other hand, if the ratio h/H is over 0.8, its effect on the engagement with the aggregate 2 is considered to increase. However, the loss of the fiber having asperities 1 in its cross sections increases, thereby increasing the risk that the fiber having asperities 1 may break at its cross sections around the recessed portions 11 of the fiber having asperities 1 before increase of the mechanical bond by slip shear force through the aggregate 2. Moreover, increasing the loss of the fiber having asperities 1 in its cross sections reduces the tensile rigidity of the fiber having asperities 1. Thus, even if the mechanical bond between the fiber having asperities 1 and the cementitious matrix is sufficiently, stretching deformation of the fiber itself leads to an increase in the width of cracks in the cementitious matrix. Consequently, an object of achieving a fiber reinforcing effect cannot be fulfilled. The parameter of the ratio h/H for the depth h of each recessed portion 11 of the fiber having asperities 1 is more preferably within a range of 0.05 to 0.5.

The mean particle diameter $\phi_A$ of the aggregate 2 is preferably within a range of 0.2 to 0.8 mm. If the mean particle diameter $\phi_A$ of the aggregate 2 is below 0.2 mm, the aggregate 2 in the recessed portions 11 of the fiber 1 having asperities is too small, thus reducing the probability of the aggregate 2 directly engaging with the recessed portions 11. As a result, the effects of high slip rigidity and high slip shear resistance around the recessed portions 11 of the fiber having asperities 1 are reduced. Moreover, in the case where the mean particle diameter $\phi_A$ is small, the slip shear resisting force of a single aggregate particle 2 decreases in proportion to the square of the diameter. However, in the case where the mean particle diameter $\phi_A$ is large, the opposite is found—the slip shear resisting force increases in proportion to the square of the diameter. On the other hand, if the mean particle diameter $\phi_A$ is over 0.8 mm, the slip shear resisting force of a single aggregate particle 2 increases, but the aggregate 2 in the recessed portions 11 of the fiber having asperities 1 is too large, thus reducing the probability of the aggregate 2 directly engaging with the recessed portions 11. As a consequence, the high slip shear rigidity and high slip shear resistance decrease. The mean particle diameter $\phi_A$ of the aggregate 2 is more preferably within a range of 0.2 to 0.6 mm.

Moreover, for the pitch p of the asperities in the longitudinal direction of the fiber having asperities 1, the ratio p/B thereof to the largest cross-sectional diameter B of the fiber having asperities 1 is set to 0.3 to 10.0. If the ratio p/B is below 0.3, the pitch p of the asperities in the longitudinal direction is short, i.e., the length of each raised portion 12 is short. As a result, the resistance length of each anchor of the fiber having asperities 1 mentioned above decreases. This leads to a decrease in the slip shear rigidity and a decrease in the slip shear yield strength of each raised portion 12 of the fiber having asperities 1 against slip shear force generated between the fiber having asperities 1 and the cementitious matrix. The decrease in the slip shear rigidity leads to an increase in the width of cracks in the ultra-high-strength fiber reinforced concrete and a decrease in the toughness thereof. Moreover, the decrease in the slip shear yield strength leads to a decrease in the tensile strength of the ultra-high-strength fiber reinforced concrete.

On the other hand, if the ratio p/B is over 10.0, the above problem is improved, but the number of the recessed portions 11, . . . of the fiber having asperities 1 decreases, thereby reducing the number of the anchors of the cementitious matrix mentioned above. Accordingly, the risk of slip shear fracture of the cementitious matrix is increased, and the slip shear resisting force, i.e. the mechanical bond is reduced as a whole.

In this respect, the ratio p/B is set to 0.3 to 10.0. In this way, the anchors of the cementitious matrix and the anchors of the fiber having asperities 1 are disposed in a well-balanced arrangement. Accordingly, even when major slip shear displacement (debonding) occurs, a large decrease in bond resisting force that would be caused by an unbalanced arrangement of the bonding mechanisms does not occur. The ratio p/B for the pitch p of the recessed portions 11 among the asperities in the longitudinal direction of the fiber having asperities 1 is more preferably within a range of 0.5 to 7.0.

As described above, the ultra-high-strength fiber reinforced concrete of this embodiment can have high tensile strength, high flexural strength, and high toughness performance, in addition to compressive strength, while maintaining fresh properties in which fluidity is held.

The ultra-high-strength fiber reinforced concrete of this embodiment has a mechanism of maintaining sustainable bond that prevents the reduction in mechanical engagement even if bond shift (slip) of major deformation occurs between the fiber and the cementitious matrix by imparting mechanical engagement between the asperities given in the fiber surface and the aggregate in the cementitious matrix even if the chemical adhesion between the fiber surface and the cementitious matrix is cut. Thereby, even if the width of a crack is increased, the bridging effect of the fibers covering the tensile force is not reduced. Accordingly, it is possible to increase the tensile strength and improve the toughness. Specifically, the fibers having asperities 1 each of which has, on its fiber surface, an asperity pattern defined within a given range are mixed, or combined, to a cementitious matrix in which aggregate is mixed by mix proportions defined within a given range. Thus, it is possible to achieve a bonding effect between the fibers having asperities 1 and the cementitious matrix which can never be achieved on its own individually, and a bridging effect as fiber reinforced concrete.

Moreover, synergy of the combination of the asperity pattern of each fiber having asperities 1 and the blended weight of the aggregate makes it possible to achieve high tensile strength and high toughness after development of a crack which cannot be achieved by conventional ultra-high-strength fiber reinforced concretes.

Moreover, as for the blending proportion of the cementitious matrix in the ultra-high-strength fiber reinforced concrete, the water-cement ratio is extremely small compared to conventional concretes, and the unit cement content is high. Thus, the cementitious matrix can have an ultra-high compressive strength of at least 150 N/mm$^2$. Further, by using the ultra-high-strength fiber reinforced concrete of this embodiment, the components of conventional concrete structures for civil engineering and construction can be reduced in thickness and weight, and improvement in design flexibility and durability of the components can be achieved. As a result, reduction in construction cost and reduction in administrative and maintenance expenses can be achieved.

EXAMPLE 1

Hereinbelow, this Example 1 will describe the results of the tests performed to verify the performance of the cementitious matrix described in the above embodiment. Note that the description will be provided by giving the same terminology or the same reference signs to portions that are the same as or equivalent to the contents described in the above embodiment.

[Materials Used]

Table 1 shows specifications of materials used in the tests of Example 1.

TABLE 1

| Basic Material | Type of Material | Density (g/cm$^3$) | Blaine Specific Surface Area (cm$^2$/g) | BET Specific Surface Area (m$^2$/g) |
|---|---|---|---|---|
| Cement | Ordinary Portland | 3.16 | 3220 | — |
| | Moderate Heat Portland | 3.21 | 3200 | — |
| Silica Fume | — | 2.25 | — | 17.1 |
| Pozzolanic Material | Fly Ash | 2.32 | 4180 | — |
| | Ground Blast Furnace Slag A | 2.91 | 8470 | — |
| | Ground Blast Furnace Slag B | 2.91 | 6130 | — |
| Limestone powder | — | 2.71 | 9550 | — |
| Aggregate | Largest Particle Diameter 2.5 mm (Grading Adjusted) | 2.59 | Mean Particle Diameter 0.27 mm | |

[Test Items and Test Methods]

(1) Flow value: The flow value is a flow value without falling motion (mm) measured by a method in accordance with "JIS R 5201 (Physical test method for cement)", without performing 15 times falling motion, and in the state where 90 seconds have passed from the start of the flow test.

(2) Flow time: The flow time is the time required until the above flow value reaches 200 mm.

(3) Compressive strength: The compressive strength was measured by a method in accordance with "The Standard of Japan Society of Civil Engineers JSCE-F 506 (Method for preparing cylindrical specimens for compressive strength tests of mortar or cement paste)" and "The Standard of Japan Society of Civil Engineers JSCE-G 505 (Test method for compressive strength of mortar or cement paste using cylindrical specimens)". A mixed concrete material was poured into a formwork having an inner space measuring φ5×10 cm and cured for 48 hours at 20° C. as primary curing to obtain hardened specimens. Then, the resulting hardened specimens were tested and measured for compressive strength (compressive strength after primary curing). Subsequently, the hardened specimens after primary curing were subjected to secondary curing in which the hardened specimens were heated to 85° C. at a heating rate of +15° C./hour, maintained at 85° C. for 40 hours, and cooled to 20° C. at a cooling rate of −5° C./hour. The resulting hardened specimens were tested and measured for compressive strength (compressive strength after secondary curing). Note that three specimens were prepared in the tests, and the mean value of the strength test was used as compressive strength data.

(4) Flexural strength: The flexural strength was measured by a method in accordance with "JIS R 5201 (Physical test method for cement)". A mixed material was poured into a formwork in the shape of a square column and having an inner space measuring 4×4×16 cm and cured for 48 hours at 20° C. as primary curing to obtain hardened specimens. The resulting hardened specimens were tested and measured for flexural strength (flexural strength after primary curing). Subsequently, the hardened specimens after primary curing were subjected to secondary curing in which the hardened specimens were heated to 85° C. at a heating rate of +15° C./hour, maintained at 85° C. for 40 hours, and cooled to 20° C. at a cooling rate of −5° C./hour. The resulting hardened specimens were tested and measured for flexural strength (flexural strength after secondary curing). Note that three specimens were prepared in the tests, and the mean value of the flexural test was used as flexural strength data.

(5) Splitting tensile strength: The splitting tensile strength was measured by a method in accordance with "JIS A 1113 (Test method for splitting tensile strength of concrete)". A mixed material was poured into a formwork having an inner space measuring φ10×20 cm and subjected to the above-described primary curing to obtain hardened specimens, followed by secondary curing in which the hardened specimens were heated to 85° C. at a heating rate of +15° C./hour, maintained at 85° C. for 40 hours, and cooled to 20° C. at a cooling rate of −5° C./hour. The resulting hardened specimens were tested and measured for splitting tensile strength (splitting tensile strength after secondary curing).

(6) Length change: There is provided a formwork in the shape of a square column and having an inner space measuring □10×10×40 cm, on the inner surface of which is adhered a Teflon sheet (registered trademark) for avoiding restriction by the formwork during shrinkage of a material. An embedded strain gage (KH-100HB manufactured by Tokyo Sokki Kenkyujo Co., Ltd.) having a gage length of 100 mm and a thermocouple are fixed with a cotton yarn, suspended in midair, in the central part of the formwork, and then a mixed material is poured. The measurement data of strain and temperature is recorded with a data logger from immediately after the pouring to determine the strain (length change) after the completion of setting of the material. Note that since the length change due to the temperature change (heat caused by hydration reaction and heat caused by curing) of the material is also included in the measurement data of the embedded strain gage, the value of the length change by heat is corrected from the thermograph, and the length change is determined as a value of the length change at 20° C.

[Mixed Proportions]

Table 2 shows the mixed proportions (numerical values show parts by weight) for 20 cases of the cementitious matrix of this embodiment (Examples) and Comparative Examples.

TABLE 2

| Classification | Run Number | Cement Moderate-heat/ Ordinary | Silica Fume | Pozzolanic Material | | | | Limestone powder | Aggregate |
| | | | | Fly Ash | Ground Blast Furnace Slag A | Ground Blast Furnace Slag B | Total | | |
|---|---|---|---|---|---|---|---|---|---|
| Comparative Example | 1-1 | Moderate-heat 100 | 15 | 58 | 0 | — | 58 | 0 | 128 |
| Comparative Example | 1-2 | Moderate-heat 100 | 15 | 32 | 33 | — | 65 | 0 | 128 |
| Comparative Example | 1-3 | Moderate-heat 100 | 15 | 0 | 75 | — | 75 | 0 | 128 |
| Example | 1-4 | Moderate-heat 100 | 15 | 0 | 64 | — | 64 | 12 | 128 |
| Example | 1-5 | Moderate-heat 100 | 15 | 0 | 55 | — | 55 | 20 | 128 |
| Example | 1-6 | Moderate-heat 100 | 15 | 24 | 32 | — | 56 | 12 | 128 |
| Example | 1-7 | Moderate-heat 100 | 15 | 22 | 30 | — | 52 | 20 | 128 |
| Comparative Example | 1-8 | Moderate-heat 100 | 15 | 26 | 21 | — | 47 | 30 | 128 |
| Example | 1-9 | Moderate-heat 100 | 15 | 0 | 69 | — | 69 | 5 | 128 |
| Example | 1-10 | Moderate-heat 100 | 15 | 29 | 35 | — | 64 | 5 | 128 |
| Comparative Example | 2-1 | Ordinary 100 | 15 | 60 | 0 | — | 60 | 0 | 128 |
| Comparative Example | 2-2 | Ordinary 100 | 15 | 33 | — | 33 | 66 | 0 | 128 |
| Comparative Example | 2-3 | Ordinary 100 | 15 | 0 | 75 | — | 75 | 0 | 128 |
| Example | 2-4 | Ordinary 100 | 15 | 0 | — | 62 | 62 | 12 | 128 |
| Example | 2-5 | Ordinary 100 | 15 | 0 | 54 | — | 54 | 20 | 128 |
| Example | 2-6 | Ordinary 100 | 15 | 25 | — | 31 | 56 | 12 | 128 |
| Example | 2-7 | Ordinary 100 | 15 | 22 | 27 | — | 49 | 20 | 128 |
| Comparative Example | 2-8 | Ordinary 100 | 15 | 17 | — | 22 | 39 | 30 | 128 |
| Example | 2-9 | Ordinary 100 | 15 | 0 | 70 | — | 70 | 5 | 128 |
| Example | 2-10 | Ordinary 100 | 15 | 28 | 35 | — | 63 | 5 | 128 |

The purpose of setting the mix proportions to those shown in Table 2 is: i) to reveal the influence of the difference of the cement type between moderate-heat Portland cement (Run Numbers 1-1 to 1-10) and ordinary Portland cement (Run Numbers 2-1 to 2-10) on the test results; ii) to reveal the influence of changing the parts by weight of limestone powder between 0 to 30 parts by weight based on 100 parts by weight of cement on the test results; iii) to reveal that the advantageous effect of the invention of this cementitious matrix is maintained even when the combination of the pozzolanic materials is changed; and iv) to reveal that the advantageous effect of the invention of this cementitious matrix is maintained even when the Blaine specific surface area of ground blast furnace slag is changed within the range of a specified value.

On the other hand, Table 3 shows the mix proportions (numerical values show parts by weight) for 15 cases of this cementitious matrix (Examples) and Comparative Examples set from a different point of view.

TABLE 3

| Classification | Run Number | Cement Moderate-heat/ Ordinary | Silica Fume | Fly Ash | Pozzolanic Material Ground Blast Furnace Slag A | Total | Limestone Powder | Aggregate |
|---|---|---|---|---|---|---|---|---|
| Example | 3-1 | Moderate-heat 100 | 15 | 67 | 0 | 67 | 12 | 109 |
| Example | 3-2 | Moderate-heat 100 | 15 | 34 | 42 | 76 | 12 | 109 |
| Comparative Example | 3-3 | Moderate-heat 100 | 15 | 0 | 85 | 85 | 12 | 109 |
| Comparative Example | 3-4 | Moderate-heat 100 | 5 | 0 | 99 | 99 | 12 | 109 |
| Comparative Example | 3-5 | Moderate-heat 100 | 35 | 0 | 38 | 38 | 12 | 128 |
| Example | 3-6 | Moderate-heat 100 | 15 | 30 | 37 | 67 | 12 | 118 |
| Example | 3-7 | Moderate-heat 100 | 15 | 59 | 0 | 59 | 12 | 118 |
| Example | 3-8 | Moderate-heat 100 | 15 | 0 | 74 | 74 | 12 | 118 |
| Comparative Example | 3-9 | Moderate-heat 100 | 25 | 24 | 0 | 24 | 25 | 134 |
| Comparative Example | 3-10 | Moderate-heat 100 | 15 | 78 | 0 | 78 | 0 | 109 |
| Example | 4-1 | Moderate-heat 100 | 15 | 46 | 0 | 46 | 11 | 134 |
| Example | 4-2 | Moderate-heat 100 | 15 | 23 | 29 | 52 | 11 | 134 |
| Example | 4-3 | Moderate-heat 100 | 15 | 0 | 58 | 58 | 11 | 134 |
| Comparative Example | 4-4 | Moderate-heat 100 | 0 | 0 | 76 | 76 | 11 | 134 |
| Comparative Example | 4-5 | Moderate-heat 100 | 4 | 0 | 70 | 70 | 11 | 134 |

The purpose of setting the mix proportions to those shown in Table 3 is: i) to reveal the assessment in the case where the type of cement is fixed to moderate-heat Portland cement, and the parts by weight of silica fume, a pozzolanic material, and limestone powder based on 100 parts by weight of cement are each set outside a specified upper limit or a specified lower limit; and ii) to reveal the influence of the amount of aggregate mixed (parts by weight) by changing the parts by weight of aggregate based on 100 parts by weight of cement so that they can be compared with the mix proportions shown in Table 2.

[Test Results]

Table 4 and Table 5 show the test results corresponding to the mix proportions shown in Table 2 and Table 3, respectively. Here, all the values of compressive strength, flexural strength, and splitting tensile strength (shown as "splitting strength") represent the mean strength determined from three specimens. The conditions in primary curing and secondary curing are as described in the above [Test Items and Test Methods].

TABLE 4

| Classification | Run Number | Fresh Properties Flow Time Second | Fresh Properties Flow Value mm | After Primary Curing Compressive Strength Φ5*10 N/mm² | After Primary Curing Flexural Strength □4*4*16 N/mm² | After Secondary Curing Splitting Strength Φ10*20 N/mm² | After Secondary Curing Compressive Strength Φ5*10 N/mm² | After Secondary Curing Flexural Strength □4*4*16 N/mm² | Strain during Primary Curing μ | Strain during Secondary Curing μ | Final Strain μ |
|---|---|---|---|---|---|---|---|---|---|---|---|
| Comparative Example | 1-1 | 8.8 | 277 | 65.5 | 12.0 | 6.22 | 205 | 22.2 | 1117 | 350 | 1467 |
| Comparative Example | 1-2 | 7.8 | 275 | 75.6 | 11.9 | 9.65 | 211 | 27.4 | 1147 | 380 | 1527 |
| Comparative Example | 1-3 | 9.7 | 263 | 84.7 | 13.5 | 6.25 | 213 | 26.7 | 1142 | 440 | 1582 |
| Example | 1-4 | 12.2 | 256 | 89.5 | 11.3 | 7.56 | 205 | 26.1 | 711 | 330 | 1041 |
| Example | 1-5 | 11.0 | 250 | 85.7 | 10.0 | 10.30 | 202 | 26.8 | 626 | 310 | 936 |
| Example | 1-6 | 12.2 | 263 | 79.5 | 10.4 | 8.62 | 210 | 24.7 | 600 | 300 | 900 |
| Example | 1-7 | 16.0 | 253 | 77.2 | 9.3 | 7.48 | 194 | 23.8 | 540 | 300 | 840 |
| Comparative Example | 1-8 | 21.0 | 210 | 75.9 | 8.2 | 6.01 | 203 | 22.8 | 490 | 280 | 770 |
| Example | 1-9 | 9.2 | 260 | 84.1 | 9.8 | 8.80 | 210 | 28.0 | 820 | 390 | 1210 |
| Example | 1-10 | 6.4 | 281 | 72.3 | 8.8 | 8.18 | 219 | 24.8 | 751 | 370 | 1121 |
| Comparative Example | 2-1 | 11.4 | 267 | 64.4 | 9.9 | 9.09 | 207 | 17.0 | 1065 | 330 | 1395 |
| Comparative Example | 2-2 | 11.0 | 262 | 74.4 | 10.0 | 9.50 | 213 | 23.4 | 1080 | 360 | 1440 |
| Comparative Example | 2-3 | 10.9 | 250 | 85.2 | 11.0 | 9.40 | 214 | 21.9 | 1222 | 380 | 1602 |
| Example | 2-4 | 11.2 | 247 | 82.5 | 10.4 | 8.97 | 206 | 20.0 | 715 | 310 | 1025 |
| Example | 2-5 | 13.6 | 254 | 83.7 | 12.6 | 9.75 | 203 | 20.5 | 706 | 300 | 1006 |
| Example | 2-6 | 11.8 | 253 | 80.5 | 9.7 | 8.52 | 205 | 19.1 | 595 | 320 | 915 |
| Example | 2-7 | 16.1 | 252 | 77.9 | 9.8 | 9.34 | 201 | 19.3 | 531 | 290 | 821 |
| Comparative Example | 2-8 | 16.9 | 234 | 72.7 | 11.2 | 6.64 | 197 | 18.1 | 483 | 280 | 763 |

TABLE 4-continued

| Classification | Run Number | Fresh Properties | | After Primary Curing | | After Secondary Curing | | | Strain during Primary Curing μ | Strain during Secondary Curing μ | Final Strain μ |
|---|---|---|---|---|---|---|---|---|---|---|---|
| | | Flow Time Second | Flow Value mm | Compressive Strength Φ5*10 N/mm² | Flexural Strength □4*4*16 N/mm² | Splitting Strength Φ10*20 N/mm² | Compressive Strength Φ5*10 N/mm² | Flexural Strength □4*4*16 N/mm² | | | |
| Example | 2-9 | 13.5 | 244 | 84.7 | 11.2 | 10.30 | 199 | 20.1 | 843 | 340 | 1183 |
| Example | 2-10 | 12.3 | 247 | 74.3 | 11.8 | 8.61 | 211 | 21.0 | 721 | 330 | 1051 |

TABLE 5

| Classification | Run Number | Fresh Properties | | After Primary Curing | | After Secondary Curing | | | Strain during Primary Curing μ | Strain during Secondary Curing μ | Final Strain μ |
|---|---|---|---|---|---|---|---|---|---|---|---|
| | | Flow Time Second | Flow Value mm | Compressive Strength Φ5*10 N/mm² | Flexural Strength □4*4*16 N/mm² | Splitting Strength Φ10*20 N/mm² | Compressive Strength Φ5*10 N/mm² | Flexural Strength □4*4*16 N/mm² | | | |
| Example | 3-1 | 17.2 | 243 | 63.8 | 10.4 | 8.64 | 213 | 17.5 | 492 | 350 | 842 |
| Example | 3-2 | 13.6 | 257 | 75.3 | 12.0 | 11.40 | 215 | 21.3 | 869 | 390 | 1259 |
| Comparative Example | 3-3 | Not Measurable | Not Measurable | 74.9 | 10.8 | 6.85 | 208 | 22.8 | 935 | 330 | 1265 |
| Comparative Example | 3-4 | 23.3 | 230 | 90.1 | 11.4 | 9.57 | 223 | 23.6 | 1127 | 370 | 1497 |
| Comparative Example | 3-5 | Not Measurable | 150 | 77.9 | 11.2 | 9.00 | 182 | 21.4 | 1152 | 380 | 1532 |
| Example | 3-6 | 11.6 | 247 | 78.7 | 10.2 | 10.00 | 216 | 21.5 | 720 | 400 | 1120 |
| Example | 3-7 | 12.7 | 253 | 71.7 | 9.6 | 7.67 | 197 | 17.4 | 645 | 350 | 995 |
| Example | 3-8 | 18.6 | 257 | 80.9 | 12.0 | 10.00 | 205 | 23.1 | 899 | 370 | 1269 |
| Comparative Example | 3-9 | 84.7 | 211 | 64.7 | 8.8 | 6.38 | 199 | 13.5 | 505 | 390 | 895 |
| Comparative Example | 3-10 | 25.3 | 236 | 61.0 | 9.5 | 6.29 | 206 | 15.6 | 1252 | 380 | 1632 |
| Example | 4-1 | 10.4 | 269 | 62.6 | 10.0 | 9.60 | 192 | 20.3 | 413 | 370 | 783 |
| Example | 4-2 | 9.4 | 266 | 72.0 | 13.0 | 8.55 | 197 | 23.8 | 555 | 340 | 895 |
| Example | 4-3 | 9.5 | 263 | 79.8 | 11.5 | 9.61 | 207 | 26.2 | 655 | 360 | 1015 |
| Comparative Example | 4-4 | 19.3 | 224 | 76.2 | 10.7 | 10.70 | 206 | 25.9 | 860 | 430 | 1290 |
| Comparative Example | 4-5 | 28.8 | 232 | 74.3 | 12.6 | 9.30 | 207 | 23.9 | 935 | 330 | 1265 |

Hereinafter, discussion of test results will be given.

(1) As a result of 35 cases of experiments in total performed according to the mix proportions shown in Table 2 and Table 3, 20 cases of test results of Examples corresponding to this cementitious matrix all had good flow time and flow value which show fresh properties. On the other hand, in 15 cases of Comparative Examples, seven cases (Run Numbers 1-8, 2-8, 3-3, 3-4, 3-5, 3-9, and 3-10) had poor fresh properties. This is because the parts by weight of either silica fume, a pozzolanic material or limestone powder based on 100 parts by weight of cement are outside the upper specified limit or the lower specified limit. Moreover, compressive strength, flexural strength, and splitting tensile strength after primary curing or secondary curing of Examples show generally excellent results as compared with those of Comparative Examples. Further, with respect to the autogenous shrinkage during curing, Examples show the results of smaller autogenous shrinkage than those of Comparative Examples.

(2) When Examples of the series of Run Numbers 1-1 to 1-10 in which moderate-heat Portland cement is employed (Run Number 1-* series) shown in Table 2 is compared with Examples of the series of Run Numbers 2-1 to 2-10 in which ordinary Portland cement is employed (Run Number 2-* series), any difference in the results depending on the type of cement was not significantly observed for fresh properties, mechanical characteristics such as compressive strength and flexural strength, and shrinkage characteristics.

(3) It has been found that the amount of shrinkage (strain) during curing in the case of Examples in which 5 to 20 parts by weight of limestone powder was blended with 100 parts by weight of cement (Run Numbers 1-4 to 1-7, 1-9, 1-10, 2-4 to 2-7, 2-9, and 2-10) is smaller than that in the case of Comparative Examples in which the parts by weight of limestone powder is shown as zero in the mix proportions (Run Numbers 1-1 to 1-3, and 2-1 to 2-3). This is because a suitable amount of limestone powder which does not undergo pozzolanic reaction is blended in addition to a pozzolanic material, and such a combination is the characteristics of this cementitious matrix. Thus, it has been verified that this cementitious matrix can provide better shrinkage reduction effect than that obtained by mixing only a pozzolanic material. The shrinkage reduction effect is obtained probably because limestone powder suppresses initial hydration of an aluminate phase ($C_3A$) or a ferrite phase ($C_3AF$) in the primary stage of hydration reaction.

(4) The results in the case of Comparative Examples in which 30 parts by weight of limestone powder was blended with 100 parts by weight of cement (Run Numbers 1-8 and 2-8) showed significant reduction in the amount of shrinkage. However, from the results of the flow time and the flow value, it can be said that both Run Number 1-8 and Run Number 2-8, which are Comparative Examples, have poor fresh properties. Moreover, it has been found that mechanical characteristics including splitting tensile strength are also reduced. This is probably because limestone powder does not have a role as a binder in the final stage of curing (after secondary curing).

(5) In the mix proportions shown in Table 2 and Table 3, 109 to 134 parts by weight of aggregate are blended with 100 parts by weight of cement. Run Number 1-1 (128 parts by weight of aggregate) and Run Number 3-10 (109 parts by weight of aggregate) in Comparative Examples provided a final shrinkage strain of 1467μ and 1632μ, respectively. On the other hand, Run Number 1-6 (128 parts by weight of aggregate) and Run Number 3-2 (109 parts by weight of aggregate) in Examples provided a final shrinkage strain of 900μ and 1259μ, respectively. Further, Run Number 4-2 (134 parts by weight of aggregate) and Run Number 3-6 (118 parts by weight of aggregate) in Examples provided a final shrinkage strain of 895μ and 1120μ, respectively. Furthermore, Run Number 1-4 (128 parts by weight of aggregate) and Run Number 3-8 (118 parts by weight of aggregate) in Examples provided a final shrinkage strain of 1041μ and 1269μ, respectively.

These results have revealed that the amount of shrinkage can be reduced by increasing the parts by weight of aggregate. Thus, in this cementitious matrix, the shrinkage is reduced by mixing 70 to 150 parts by weight of aggregate having a largest particle diameter Dmax, being a largest aggregate particle diameter, of 1.2 to 3.5 mm based on 100 parts by weight of cement.

(6) Run Number 3-5 in Comparative Examples, in which 35 parts by weight of silica fume is blended with 100 parts by weight of cement, has poor fresh properties. This is probably because the parts by weight of a pozzolanic material is reduced by blending a large amount of silica fume having a very large specific surface area, and as a result, a material having an intermediate particle diameter is missing, the intermediate particle diameter being positioned between the particle diameter of silica fume and the particle diameter of cement, thereby making it impossible to achieve the densest packing. Further, it has been found that the amount of shrinkage (strain) during primary curing is increased. This is probably because hydration reaction is accelerated in the primary stage of hydration.

(7) Run Number 3-3 and Run Number 3-4 in Comparative Examples both have poor fresh properties. In Run Number 3-3, 85 parts by weight of a pozzolanic material is blended with 100 parts by weight of cement, and in Run Number 3-4, 99 parts by weight of a pozzolanic material is mixed with 100 parts by weight of cement. This is probably because, similar to the reason described in the preceding clause (6), if the parts by weight of a pozzolanic material are too large, a powder having an intermediate particle diameter will be excessively increased, making it impossible to achieve the densest packing. Moreover, the amount of shrinkage (strain) was also increased. Further, the values of splitting tensile strength were also smaller than those in Examples.

(8) It is found that, in Run Number 3-9 in Comparative Examples in which a small amount (24 parts by weight) of a pozzolanic material is blended with 100 parts by weight of cement, fresh properties are poor, and flexural strength after primary curing and secondary curing and splitting tensile strength after secondary curing are smaller than those in Examples. The poor fresh properties are due to the same reasons as described in the preceding clauses (6) and (7). The splitting tensile strength has decreased, probably because the reduction in the parts by weight of a pozzolanic material has reduced the amount of a binder excluding cement, causing the reduction in tensile strength.

(9) The pairs of Run Numbers 1-2 and 2-2, 1-4 and 2-4, 1-6 and 2-6, and 1-8 and 2-8 each have the same blending proportion, except for the difference in the Blaine specific surface area of ground blast furnace slag. A comparison of the fresh properties, mechanical characteristics, and the amount of shrinkage of these pairs reveals that if the Blaine specific surface area of a pozzolanic material is within a preferred range, the fresh properties, mechanical characteristics, and the amount of shrinkage are not affected.

EXAMPLE 2

Herein below, this Example 2 will describe the results of tests performed to confirm performance of the ultra-high-strength fiber reinforced concretes described in the embodiment discussed above. Note that the description will be provided by giving the same terminology or the same reference signs to portions that are the same as or equivalent to the contents described in the above embodiment or Example 1.

[Materials Used and Mix Proportions]

The materials shown in Table 1 of Example 1 are used to prepare cementitious matrices having the mix proportions shown in Table 6 below. Then, fibers shown in Table 7 are mixed with a cementitious matrix of each mixed proportion to prepare a specimen of an ultra-high-strength fiber reinforced cement based mixed material, which is used to perform a comparative study to thereby verify the validity of the ultra-high-strength fiber reinforced concrete described in this embodiment.

TABLE 6

| | | | Pozzolanic Material | | | | | |
| --- | --- | --- | --- | --- | --- | --- | --- | --- |
| Classification | Matrix Symbol | Cement Moderate-heat | Silica Fume | Fly Ash | Ground Blast Furnace Slag A | Total | Limestone powder | Aggregate |
| Example | M-A | 100 | 14 | 26 | 26 | 52 | 11 | 136 |
| Example | M-B | 100 | 15 | 26 | 26 | 52 | 11 | 124 |
| Example | M-C | 100 | 15 | 26 | 26 | 52 | 11 | 114 |
| Example | M-D | 100 | 15 | 0 | 52 | 52 | 13 | 121 |
| Comparative Example | M-E | 100 | 4 | 86 | 0 | 86 | 0 | 109 |

TABLE 7

| Classification | Fiber Symbol | Material | Volume Mixing Ratio (%) Subtotal | Volume Mixing Ratio (%) Total | Tensile Strength (MPa) | Elastic Modulus (GPa) | Mean Cross-Sectional Diameter d (mm) | Length Li (mm) | Aspect Ratio Li/d |
|---|---|---|---|---|---|---|---|---|---|
| Example | F-A | Steel Fiber | 2.00 | 2.00 | 2900 | 210 | 0.22 | 20 | 91 |
| Example | F-B | Steel Fiber | 1.50 | 1.75 | 2900 | 210 | 0.22 | 20 | 91 |
|  |  | Steel Fiber | 0.25 |  |  |  | 0.22 | 15 | 68 |
| Example | F-C | Steel Fiber | 1.25 | 2.00 | 2900 | 210 | 0.22 | 20 | 91 |
|  |  | PP Fiber | 0.75 |  | 640 | 10 | 0.52 | 24 | 46 |
| Example | F-D | Steel Fiber | 1.75 | 1.75 | 2900 | 210 | 0.22 | 18 | 82 |

Moderate-heat Portland cement was employed in all five kinds of cementitious matrices from the matrix symbol M-A to M-E shown in Table 6. Moreover, in the matrix symbol M-E of Comparative Example, 4 parts by weight of silica fume is blended, which is slightly outside the range of the cementitious matrix of this embodiment. Further, the blending proportion of a pozzolanic material is 86 parts by weight, which is also over the range of this cementitious matrix.

Four kinds of fibers from the fiber symbol F-A to F-D shown in Table 7 include the cases where only steel fiber is used (other than the fiber symbol F-C), the case where steel fibers each having a different length are combined (the fiber symbol F-B), and the case where a composite fiber of steel fiber and PP (polypropylene) fiber is used (the fiber symbol F-C). The totals of the volume mixing ratio of fibers (the ratio of the volume of the mixed fibers to the total volume of the ultra-high-strength fiber reinforced concrete) are 2.0% and 1.75%. Moreover, the mean cross-sectional diameter (diameter) d and the length Li of fibers were changed so as to provide an aspect ratio AR (=Li/d) of 46 to 91.

[Test Items and Test Methods]

(1) The flow value and the flow time are the same as in Example 1, so the description is omitted.

(2) Compressive strength: The compressive strength was measured by a method in accordance with "JIS R 1108 (Test method for compressive strength of concrete)". A mixed material of a fiber reinforced cement based mixed material was poured into a formwork having an inner space measuring φ10×20 cm and cured for 48 hours at 20° C. as primary curing, followed by secondary curing in which the hardened specimen was heated to 90° C. at a heating rate of +15° C./hour, maintained at 90° C. for 30 hours, and cooled to 20° C. at a cooling rate of −5° C./hour. The resulting hardened specimen was tested and measured for compressive strength (compressive strength after secondary curing). Note that three specimens were prepared in the tests, and the mean value of the strength test was used as compressive strength data.

(3) Flexural strength: The flexural strength was measured by a method in accordance with "JIS R 5201 (Physical test method for cement)". A mixed material of a fiber reinforced cement based mixed material was poured into a formwork in the shape of a square column and having an inner space measuring □4×4×16 cm and cured for 48 hours at 20° C. as primary curing to obtain a hardened specimen, followed by secondary curing in which the hardened specimen was heated to 90° C. at a heating rate of +15° C./hour, maintained at 90° C. for 30 hours, and cooled to 20° C. at a cooling rate of −5° C./hour. The resulting hardened specimen was tested and measured for flexural strength (flexural strength after secondary curing). Note that three specimens were prepared in the tests, and the mean value of the flexural test was used as flexural strength data.

(4) Splitting tensile strength: The splitting tensile strength was measured by a method in accordance with "JIS A 1113 (Test method for splitting tensile strength of concrete)". A mixed material of a fiber reinforced cement based mixed material was poured into a formwork having an inner space measuring φ10×20 cm and subjected to the above-described primary curing to obtain a hardened specimen, followed by secondary curing in which the hardened specimen was heated to 90° C. at a heating rate of +15° C./hour, maintained at 90° C. for 30 hours, and cooled to 20° C. at a cooling rate of −5° C./hour. The resulting hardened specimen was tested and measured for splitting tensile strength (splitting tensile strength after secondary curing).

(5) Flexural strength and flexural toughness coefficient: The flexural strength and flexural toughness coefficient were measured by a method in accordance with "JSCE-G 552-2010 (Test method for bending strength and bending toughness of steel fiber reinforced concrete)". A mixed material of a fiber reinforced cement based mixed material was poured into a formwork in the shape of a square column and having an inner space measuring □110×10×40 cm and cured for 48 hours at 20° C. as primary curing to obtain a hardened specimen, followed by secondary curing in which the hardened specimen was heated to 90° C. at a heating rate of +15° C./hour, maintained at 90° C. for 30 hours, and cooled to 20° C. at a cooling rate of −5° C./hour. The resulting hardened specimen was tested and measured for flexural strength (flexural strength after secondary curing). Note that the flexural toughness coefficient was measured in according with the above test method by performing the measurement of "load-flexure at the center point".

[Test Results]

Table 8 shows combinations of cementitious matrix and fiber, and the test results.

TABLE 8

| | | | | Fresh Concrete Properties | | After Secondary Curing | | | | | |
|---|---|---|---|---|---|---|---|---|---|---|---|
| | | | | | | Splitting | Compressive | Flexural | Flexural | Tensile | Flexural |
| Classification | Run Number | Matrix Symbol | Fiber Symbol | Flow Time Second | Flow Value mm | Strength Φ10*20 N/mm² | Strength Φ10*20 N/mm² | Strength □4*4*16 N/mm² | Strength □10*10*40 N/mm² | Strength (Estimate Value) N/mm² | Toughness Coefficient N/mm² |
| Example | B1 | M-A | F-A | 12.0 | 268 | 9.66 | 215 | 53.1 | 42.1 | 15.7 | 35.9 |
| Example | B2 | M-A | F-B | 15.3 | 264 | 9.47 | 208 | 42.1 | 32.8 | 12.1 | 28.3 |
| Example | B3 | M-A | F-C | 21.1 | 240 | 10.90 | 206 | 39.7 | 28.4 | 10.4 | 25.5 |
| Example | B4 | M-B | F-D | 14.4 | 252 | 11.00 | 227 | 47.4 | 35.1 | 13.0 | 30.2 |
| Example | B5 | M-C | F-D | 10.6 | 254 | 12.70 | 226 | 52.2 | 35.2 | 13.0 | 31.2 |
| Example | B6 | M-D | F-D | 14.7 | 247 | 11.90 | 221 | 58.1 | 37.7 | 14.0 | 32.8 |
| Comparative Example | B7 | M-E | F-D | 28.3 | 231 | 7.67 | 195 | 35.7 | 20.8 | 7.4 | 17.1 |

As shown in Table 8, the test of fresh properties and the strength test after secondary curing were performed for seven cases in total from Run Number B1 to B7 by combining a cementitious matrix and fiber. Run Numbers B1 to B6 are classified as Examples, and Run Number B7 is classified as Comparative Example. The influence of fiber was investigated by employing the same cementitious matrix with the matrix symbol M-A in Run Numbers B1 to B3 of Examples and changing the combination of fibers from the fiber symbol F-A to F-C. Moreover, the influence of a cementitious matrix was investigated by using one type of fiber with the fiber symbol F-D (steel fiber) in Run Numbers B5 to B7 and changing the cementitious matrix from the matrix symbol M-C to M-E.

Figure 3:
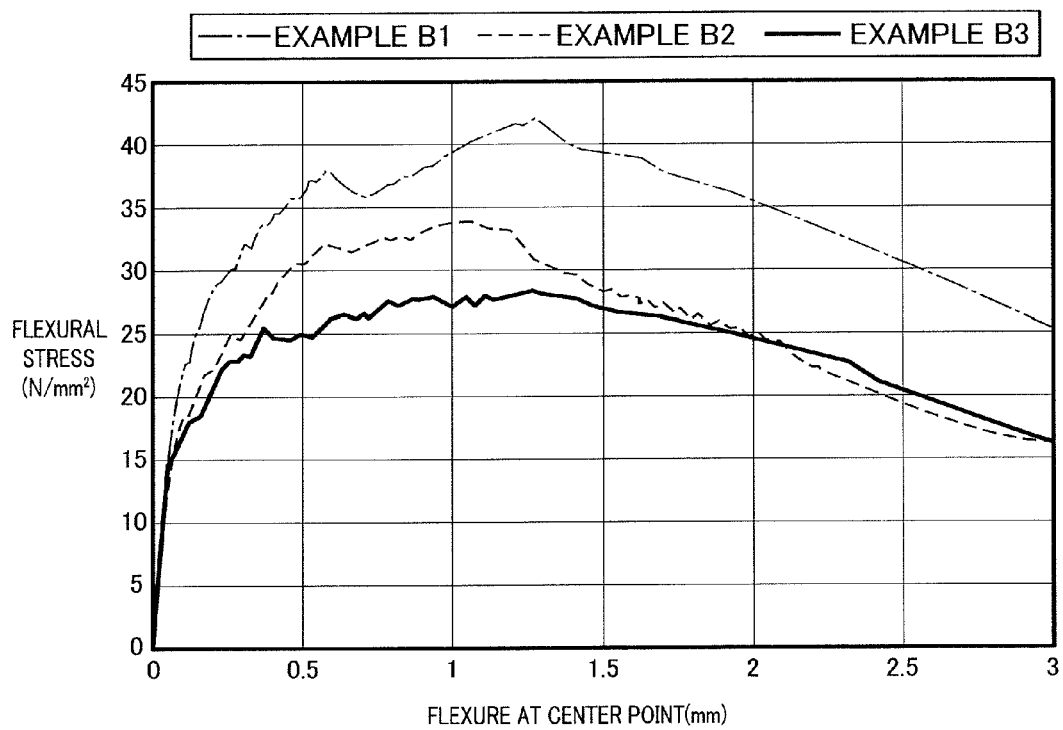
FIG. 3 is a graph describing the results of the flexural toughness tests in Example 2 (Example B1 to Example B3).
Figure 4:
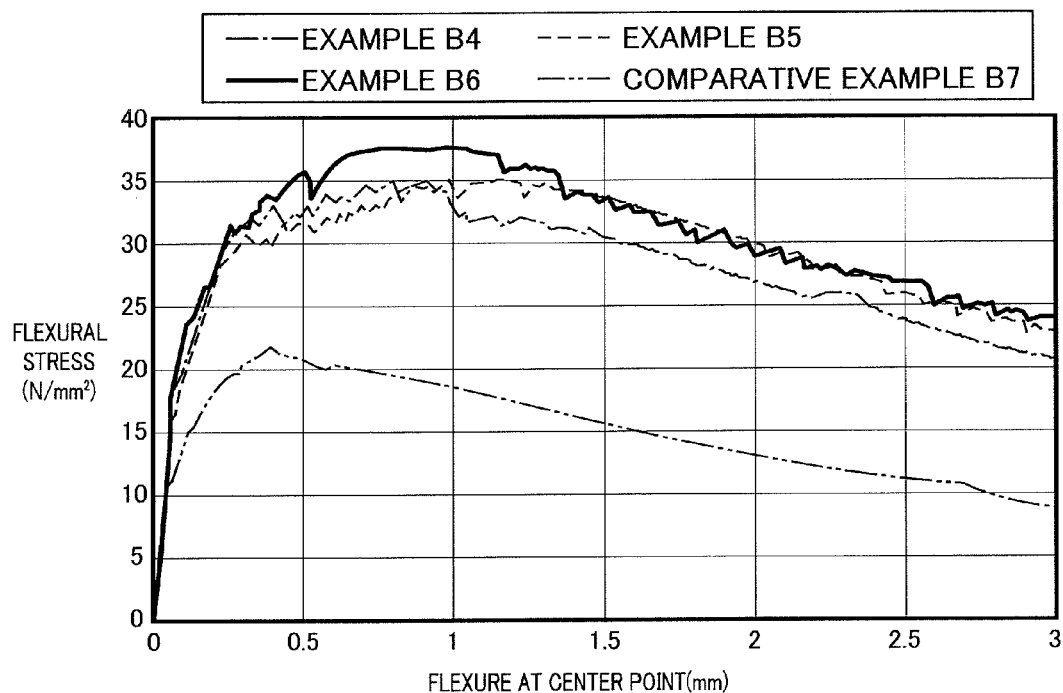
FIG. 4 is a graph describing the results of the flexural toughness tests in Example 2 (Example B4 to Example B6, Comparative Example B7).

FIG. 3 and FIG. 4 each plot the results of tests for flexural strength and a flexural toughness coefficient (flexural toughness tests) in a graph of flexural stress in the vertical axis versus flexure at the center point in the horizontal axis. FIG. 3 shows the comparison of test results in which different fibers (from the fiber symbol F-A to F-C) are each combined with the same cementitious matrix (matrix symbol M-A), and FIG. 4 shows the comparison of test results in which different cementitious matrices (from the matrix symbol M-B to M-E) are each combined with the same fiber (fiber symbol F-D).

The estimate value of the tensile strength shown in Table 8 was estimated from the flexural strength (using a specimen in the shape of a square column of □10×10×40 cm in size). The tensile strength may be directly determined by a tensile test or may be estimated through inverse analysis from the load-crack width in a flexural test using a notched test specimen. It is known that there is a strong positive correlation between flexural strength and tensile strength, and, this time, the tensile strength was determined from the correlation equation between flexural strength and tensile strength determined beforehand.

Hereinbelow, the effect of the ultra-high-strength fiber reinforced concrete of this embodiment obtained from the comparison of test results will be itemized.

(1) The test results of fresh properties shown in Table 8 reveal that this ultra-high-strength fiber reinforced concrete in which this cementitious matrix in Examples is employed has high fluidity with respect to fresh properties. On the other hand, when the cementitious matrix of Comparative Example is employed, sufficient fluidity was not able to be obtained in spite of having increased the water-cement ratio.

(2) As for the results in which different fibers (fiber symbols F-A, F-B, and F-C) are each combined with the same cementitious matrix (matrix symbol M-A), Example B1 in which the volume mixing ratio of the fibers is 2.00% showed the best mechanical performance. On the other hand, Example B3 naturally had lower flexural strength and tensile strength because the volume mixing ratio of all the fibers was 2.00%, which is the same as in Example B1, but steel fiber in an amount of 0.75% was replaced by PP fiber. However, it is found that the flexural toughness curve shown in FIG. 3 shows a flexural stress resistance equivalent to that in Example B-2 from the point where the flexure at the center point is 1.5 mm. That is, it shows that in the region where tensile strain is large, the reinforcing effect of PP fiber appears.

(3) From the test results shown in Table 8 and flexural toughness curves shown in FIGS. 3 and 4, it was proved that this ultra-high-strength fiber reinforced concrete obtained by the combination of this cementitious matrix and fibers can provide not only preferred fresh properties but also sufficiently satisfactory values including splitting (tensile) strength, tensile strength, and a flexural toughness coefficient, which are important in this type of material.

(4) When Example B4 to Example B6 are compared with Comparative Example B7, it can be said that Comparative Example B7 can neither provide satisfactory fresh properties nor satisfactory mechanical characteristics. On the other hand, all the matrix symbols M-B to M-D of this cementitious matrix, in which the combination of pozzolanic materials and the amount of blending of limestone powder are changed within the range described in the above embodiment, showed satisfactory characteristics as obvious from the mechanical characteristics shown in Table 8 and flexural toughness curves shown in FIG. 4. That is, it has been shown that if the blending proportion is within the range described in the above embodiment, stable fresh properties and mechanical characteristics are obtained even if the combination of blending is different.

EXAMPLE 3

Herein below, this Example 3 describes the results of tests performed to verify the performance of a fiber reinforced cement based mixed material having high tensile strength and toughness (or fracture energy) in which the fiber having asperities 1 described in the above embodiment is mixed. Note that the description will be provided by giving the same terminology or the same reference characters to portions that are the same as or equivalent to the contents described in the above embodiment or Examples 1 and 2.

In Example 3, a demonstration test for proving the properties of the ultra-high-strength fiber reinforced concrete in which tensile strength and toughness are improved was performed by the combination of a cementitious matrix, in which the parts by weight of aggregate and the mean particle diameter $\phi_A$ of aggregate are controlled, and the fiber having asperities 1, in which parameters of the asperity pattern are controlled.

[Materials Used and Mix Proportions]

Table 9 shows the mix proportions of cementitious matrices in which a parameter for aggregate is changed. The compressive strength shown in Table 9 was determined by preparing a specimen using only a cementitious matrix which does not contain fiber and performing a compression test after secondary curing. Moreover, flexural strength was also determined by preparing the same specimen and performing a flexural test after secondary curing.

TABLE 9

| Matrix Symbol | Mean Particle Diameter $\Phi_A$ of Aggregate (mm) | Parts by Weight of Aggregate | Compressive Strength $\Phi 10*20$ (N/mm$^2$) | Flexural Strength $\square 4*4*6$ (N/mm$^2$) |
|---|---|---|---|---|
| Example M-1 | 0.39 | 110 | 206 | 22.3 |
| Example M-2 | 0.42 | 145 | 188 | 22.6 |
| Example M-3 | 0.45 | 128 | 199 | 26.1 |
| Example M-4 | 0.15 | 134 | 187 | 25.0 |
| Example M-5 | 0.46 | 138 | 178 | 22.9 |
| Comparative Example M-1 | 0.15 | 69 | 216 | 23.8 |
| Comparative Example M-2 | 0.81 | 67 | 201 | 25.2 |

In addition to the parameters of the asperity pattern (a ratio (h/H) of a depth h of each of recessed portions to a smallest cross-sectional diameter H, a ratio (p/B) of a pitch p of the recessed portions among the asperities to a largest cross-sectional diameter B), Table 10 shows property values of the fiber that influence the result of the flexural toughness test of the ultra-high-strength fiber reinforced concrete such as the material of the fiber, the volume mixing ratio of the fiber, the tensile strength of the fiber, the elastic modulus, the cross-sectional area of a single fiber, and the length of the fiber. Here, Example F-4 and Example F-5 correspond to proportions in each of which two kinds of fibers—the fibers having asperities 1 and fibers with no asperity (steel fibers in this instance)—are mixed.

TABLE 10

| Fiber Symbol | Material | Volume Mixing Ratio (%) | Tensile Strength (Mpa) | Elastic Modulus (GPa) | Cross Sectional Area (mm$^2$) | Length (mm) | Parameters of Asperity Pattern | |
|---|---|---|---|---|---|---|---|---|
| | | | | | | | h/H | p/B |
| Example F-1 | PP Fiber | 3.0 | 640 | 10 | 0.220 | 30 | 0.3 | 4.0 |
| Example F-2 | PP Fiber | 2.8 | 640 | 10 | 0.220 | 30 | 0.3 | 4.0 |
| Example F-3 | PP Fiber | 2.8 | 640 | 10 | 0.385 | 30 | 0.1 | 1.0 |
| Example F-4 | PP Fiber | 2.7 | 640 | 10 | 0.220 | 30 | 0.3 | 4.0 |
| | Steel Fiber | 0.1 | 740 | 160 | 0.061 | 15 | No Asperity | |
| Example F-5 | PP Fiber | 2.7 | 640 | 10 | 0.385 | 30 | 0.1 | 1.0 |
| | Steel Fiber | 0.1 | 740 | 160 | 0.061 | 15 | No Asperity | |
| Comparative Example F-1 | PVA Fiber | 3.0 | 1000 | 30 | 0.077 | 15 | No Asperity | |

[Test Items and Test Methods]

The test methods for compressive strength, flexural strength, and flexural strength and a flexural toughness coefficient are the same as in Example 2, and so the description will be omitted. Moreover, the flexural fracture energy is obtained by integrating the area of a region surrounded by the flexure toughness curve obtained by the tests for flexural strength and a flexural toughness coefficient, and serves as an index representing toughness.

[Test Results]

Table 11 shows the combinations of a cementitious matrix and fiber and the test results.

TABLE 11

| Test Name | Matrix Symbol | Fiber Symbol | Tensile Strength (Estimate Value) (N/mm$^2$) | Flexural Toughness Coefficient (N/mm$^2$) | Flexural Fracture Energy (N/mm) |
|---|---|---|---|---|---|
| Example-T1 | Example M-2 | Example F-1 | 6.06 | 19.5 | 82.6 |
| Example-T2 | Example M-5 | Example F-1 | 6.13 | 18.8 | 88.5 |
| Example-T3 | Example M-5 | Example F-4 | 5.75 | 18.7 | 77.2 |
| Example-T4 | Example M-1 | Example F-5 | 6.28 | 20.3 | 87.6 |

TABLE 11-continued

| Test Name | Matrix Symbol | Fiber Symbol | Tensile Strength (Estimate Value) (N/mm²) | Flexural Toughness Coefficient (N/mm²) | Flexural Fracture Energy (N/mm) |
|---|---|---|---|---|---|
| Example-T5 | Example M-4 | Example F-4 | 6.51 | 21.3 | 86.0 |
| Example-T6 | Example M-3 | Example F-4 | 6.66 | 21.3 | 96.7 |
| Example-T7 | Example M-4 | Example F-2 | 6.13 | 19.5 | 73.3 |
| Comparative Example-T1 | Comparative Example M-1 | Example F-1 | 3.81 | 12.1 | 32.8 |
| Comparative Example-T2 | Comparative Example M-1 | Example F-4 | 3.80 | 12.1 | 34.6 |
| Comparative Example-T3 | Comparative Example M-2 | Example F-5 | 4.01 | 13.0 | 35.5 |
| Comparative Example-T4 | Comparative Example M-1 | Example F-5 | 3.29 | 13.0 | 41.7 |
| Comparative Example-T5 | Comparative Example M-1 | Example F-2 | 3.61 | 12.8 | 42.9 |
| Comparative Example-T6 | Comparative Example M-1 | Example F-3 | 2.79 | 10.9 | 38.4 |
| Comparative Example-T7 | Comparative Example M-1 | Comparative Example F-1 | 3.02 | 6.5 | 15.6 |
| Comparative Example-T8 | Comparative Example M-2 | Comparative Example F-1 | 3.92 | 10.1 | 22.5 |

Figure 5:
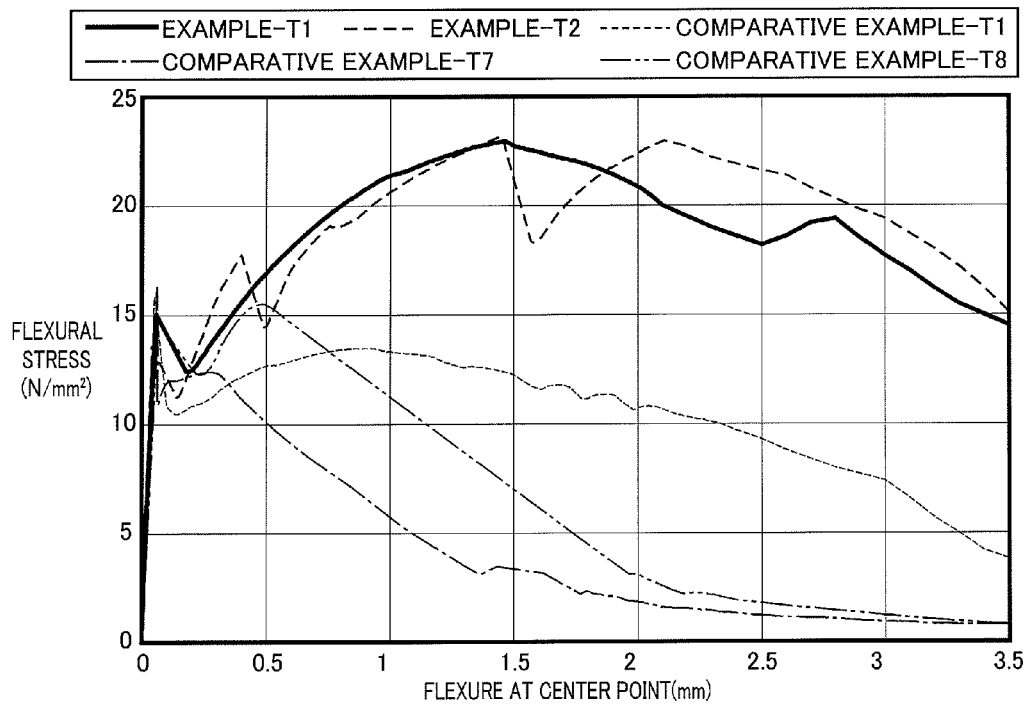
FIG. 5 is a graph describing the results of flexural toughness tests in Example 3 (Example-T1, Example-T2, Comparative Example-T1, Comparative Example-T7, Comparative Example-T8).
Figure 6:
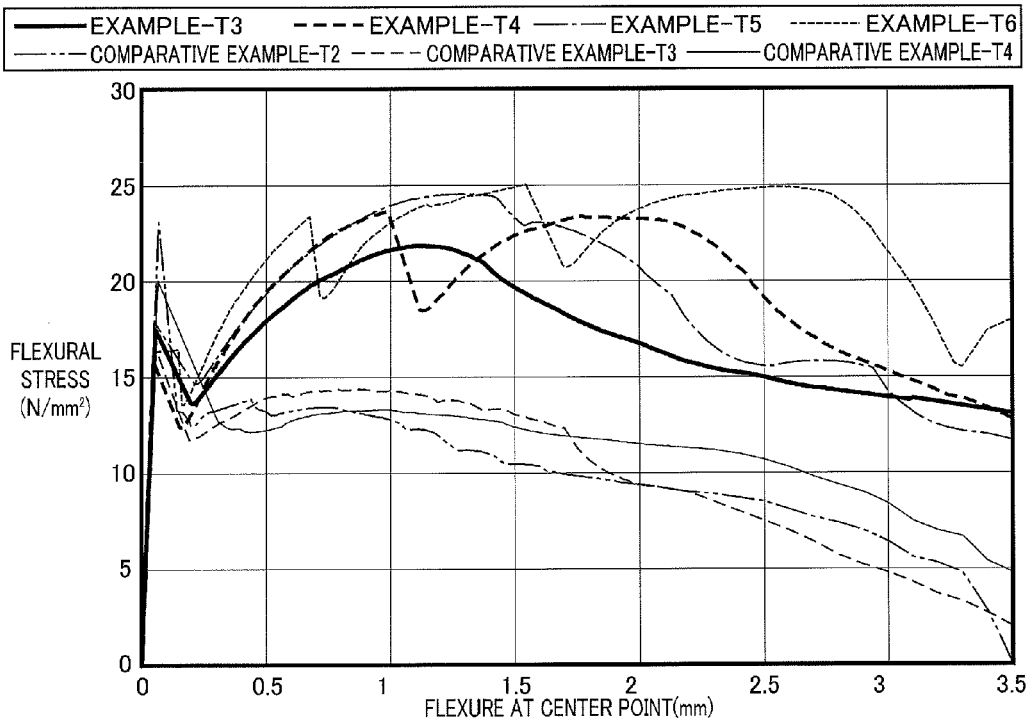
FIG. 6 is a graph describing the results of the flexural toughness tests in Example 3 (Example-T3 to Example-T6, Comparative Example-T2 to Comparative Example-T4).
Figure 7:
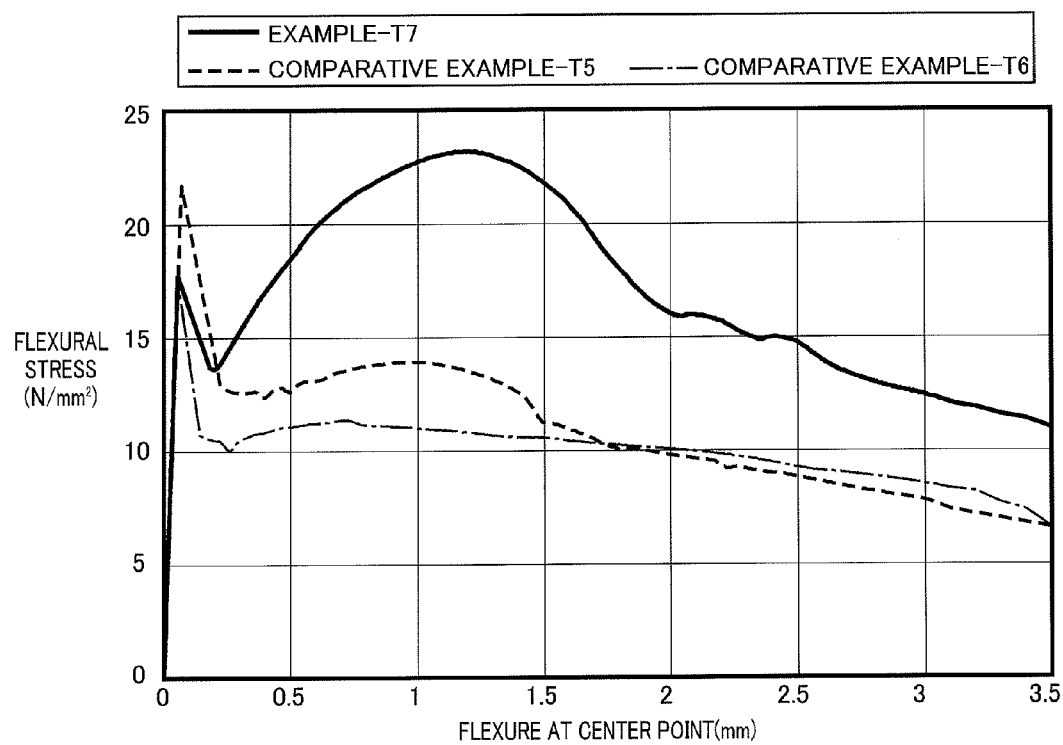
FIG. 7 is a graph describing the results of the flexural toughness tests in Example 3 (Example-T7, Comparative Example-T5, Comparative Example-T6).

FIG. 5 to FIG. 7 show the test results for flexural strength and a flexural toughness coefficient as the flexural toughness curves. The flexural toughness curves behave in common ways, which can be described as follows. Note that since organic fibers are mainly used as the reinforcing fibers in this Example 3, these flexural toughness curves are different from those obtained in FIGS. 3 and 4 of Example 2 in which metallic fibers are mainly used. That is, a "second peak" as will be described in this Example 3 is not present in the flexural toughness curves shown in FIGS. 3 and 4. This is because since metallic fibers have higher rigidity in the fiber axis direction than organic fibers, the metallic fibers hold the increase in flexural stress without causing an abrupt decrease in the flexural stress even immediately after the occurrence of flexural cracking.

In the initial stage of load application, each flexural toughness curve of Example 3 behaves in such a way that the flexural stress increases straightly with respect to the flexure at the center point, and the flexural stress then decreases abruptly. The zone showing this behavior will be referred to as the "first zone." Also, the peak that appears first will be referred to as the "first peak."

The flexural stress tends to thereafter rise again. This rise occurs either to a level that is greater than the first peak appearing first, or to a level that is not greater. The flexural stress after the rise tends to gently decrease again as the flexure at the center point increases. The zone showing this behavior will be referred to as the "second zone." Moreover, the peak that appears second will be referred to the "second peak."

Now, in the first zone, no cracking occurs in the specimen due to the course of behavior in which the flexure at the center point straightly increases as the load rises in the initial stage. Thus, the behavior can be considered elastic behavior. Moreover, the flexural stress decreases after the first peak, and this can be considered to be because flexural cracking has occurred at the lower end of the specimen around the center thereof, which in turn has caused an abrupt decrease in the flexural stress.

The flexural stress at this first peak is considered to have a positive correlation with the cracking strength of the cementitious matrix that can be found through a split test. Moreover, although the flexural stress abruptly decreases after the first peak due to the occurrence of flexural cracking at the lower end of the specimen, the flexural stress thereafter shows increasing behavior again. This is behavior occurring because the fibers bridging the cracked surfaces at which the cracking has occurred cover the tensile force. Moreover, the degree of the decrease in the flexural stress after the first peak is such that the higher the rigidity in the axial direction of the fibers, and the larger the mixed amount of the fibers, or the greater the initial bond resistance between the cementitious matrix and the fibers, the smaller the decrease tends to become. In the case of metallic fibers, the rigidity in the axial direction of the fibers is higher than in the case of organic fibers. Accordingly, the decrease in the flexural stress after the first peak is not observed.

Moreover, in the second zone, the flexural stress tends to rise again. The second peak after that rise is either greater than the first peak or not greater. The flexural stress rises in this manner because the fibers bridging the cracked surfaces cover the tensile force.

The flexural stress at this second peak has been confirmed, based on test data, to have a strong positive correlation with the tensile strength of the ultra-high-strength fiber reinforced concrete. This tensile strength is the greatest tensile stress found when pure tensile force is applied to the ultra-high-strength fiber reinforced concrete which is a kind of the ultra-high-strength fiber reinforced cement based mixed material.

Two methods have been used as methods of finding the tensile strength of an ultra-high-strength fiber reinforced concrete material through a test. One method directly finds the tensile strength from a peak of the tensile strength through a direct tensile loading test. This method has a difficulty in controlling the direct tensile loading test itself and therefore has a problem of inconsistent test results.

The other method involves: performing a flexural loading test; finding the relation between the tensile stress and the crack width through an inverse analysis using a load-notch crack width curve or a load-flexure curve obtained from the test; and calculating the tensile strength from the found relation. As for the flexural loading test, there is a case involving forming a notch in the center of the flexural specimen, and a case involving forming no notch. Moreover, this method is advantageous for its simplicity in controlling the flexure testing method and small inconsistency among tests, but the inverse analysis requires time and cost.

Moreover, after the second peak, the flexure stress tends to gently decrease again as the flexure at the center point increases. This behavior can be considered a phenomenon occurring due to cutting of the bridging fibers or gradual decrease of the bond resistance between the fibers and the cementitious matrix.

Here, the area of a region surrounded by the flexure toughness curve represents the fracture energy of the material. The larger the area, the tougher is the material.

[Results of Flexure Toughness Tests]

FIG. 5 is a set of comparisons under the same condition where the mixing ratios of the fibers are all 3.0%, and thus is a set of comparison results excluding such an influential factor that the more fibers are mixed (the higher the volume mixing ratio is), the higher becomes the flexural strength.

Example-T1 and Example-T2 are combinations of the fiber having asperities 1 of Example F-1 shown in Table 10 and the cementitious matrices of Example M-2 and Example M-5 shown in Table 9.

On the other hand, the fiber of Comparative Example-T1 is the same fiber having asperities 1 of Example F-1 as those in Example-T1 and Example-T2. However, the cementitious matrix uses a cementitious matrix of Comparative Example M-1 which has small parts by weight of the aggregate shown in Table 9. Moreover, the fibers of Comparative Example-T7 and Comparative Example-T8 are each a fiber of Comparative Example F-1 shown in Table 10, which has no asperity pattern formed on the fiber surface. Nonetheless, the material of the fiber is a PVA fiber which is highly hydrophilic, and therefore the bonding force to the cementitious matrix is considered to be high. Moreover, the cementitious matrix of Comparative Example-T7 is the material having a small mean aggregate particle diameter and small parts by weight (Comparative Example M-1), while the cementitious matrix of Comparative Example-T8 uses the cementitious matrix of Example M-2 which is used in Example-T1 and has 145 parts by weight of aggregate.

Now, the flexural toughness curves in FIG. 5 show that Example-T1 and Example-T2 show higher flexural stress and higher toughness than Comparative Example-T1, Comparative Example-7, and Comparative Example-T8. Meanwhile, the first peaks of the five cases shown in FIG. 5 show similar values. However, the second peaks of Example-T1 and Example-T2 show clearly higher values than the other Comparative Examples, and each second peak shows a significantly higher value than its first peak. This indicates that these two Examples have high tensile strength.

Moreover, in Example-T1 and Example-T2, the flexural stress gently decreases also after the second peak, which indicates that the flexural resisting force does not decease until major deformation, i.e. high toughness performance is exhibited. Table 11 mentioned above shows, for each test, tensile strength estimated from the second peak and fracture energy found from the area of the flexural toughness curve. As is clear from the numerical values shown in this Table 11, it can be seen that the tensile strength of each Example is 1.6 to 2.0 times greater than the tensile strength of each Comparative Example, and the flexural fracture energy is 2.5 to 3.6 times greater.

Here, in the flexural toughness test in Comparative Example-T7, the second peak is smaller than the first peak, and also the flexural stress abruptly decreases after the second peak. This is because, since the fiber in Comparative Example-T7 is PVA fiber, it is hydrophilic and provides high initial bond strength. Moreover, the decrease in the flexural stress also after the second peak is probably because the fibers are pulled out of the cementitious matrix due to the loss of bond resistance of the fibers.

Next, the results of flexural toughness tests shown in FIG. 6 are obtained by using the fibers shown in Example F-4 and Example F-5 in Table 10, which are composite (hybrid) fibers of a PP fiber having an asperity pattern formed on the fiber surface and a steel fiber with no asperity pattern. In Example F-4 and Example F-5, the volume mixing ratio of all the fibers is 2.8%, and the amount of the fibers is broken down into a volume mixing ratio of 2.7% for the PP fiber, which is the fiber having asperities 1, and a volume mixing ratio of 0.1% for the steel fiber having no asperity pattern on the fiber surface.

Moreover, as can be seen from the flexural toughness curves in FIG. 6, each Example has a greater second peak than Comparative Examples, and the area of the flexural toughness curve is greater as well. Moreover, while the second peak of each Example is greater than its first peak, the second peak of each Comparative Example is smaller than its first peak. Further, as shown in Table 11, the numeral values of the tensile strength and the flexural fracture energy are greater for Examples than for Comparative Examples.

The cementitious matrices employed in Examples-T3, T4, T5, T6 shown in FIG. 6 are Examples M-5, M-1, M-4, M-3, respectively, all of which have aggregate within a range of 70 to 150 parts by weight. However, only Example M-4 has a mean aggregate particle diameter of 0.15 which is under the preferable range of 0.2 to 0.8 mm. That is, comparing Example-T5 to Comparative Examples-T2, T3, T4 through FIG. 6 and Table 11 shows that Example-T5 has superior tensile strength and toughness. This indicates that the conditions for the parts by weight of the aggregate of the cementitious matrix and the ratio (h/H) for the depth h of each recessed portion of the fiber having asperities are more important than the other parameters.

Moreover, in the results of flexural toughness tests shown in FIG. 7, the volume mixing ratio of fibers is 2.8% in all the cases, and one kind of fiber is used in all the cases. Further, in Example-T7 and Comparative Example-T5, the same fiber is mixed, which is Example F-2 shown in Table 10. However, the cementitious matrix used in Comparative Example-T5 uses Comparative Example M-1, which is a material having a small mean aggregate diameter and small parts by weight. As a result, Example-T7 and Comparative Example-T5 come to draw different flexural toughness curves even though they use the fiber having asperities 1 of the same kind. Specifically, while the second peak is greater than the first peak in Example-T7, the first peak is large but the second peak is small in Comparative Example-T5. Moreover, as can be seen also from Table 11, Example-T7 has clearly higher tensile strength and thus higher toughness than Comparative Example-T5 and Comparative Example-T6. Note that while the mean particle diameter of the aggregate of the cementitious matrix employed in Example-T7 is 0.15 mm, which is small, it has 134 parts by weight of aggregate . . . .

From the test results described above, it is found that the ultra-high-strength fiber reinforced concrete of the embodiment can achieve high tensile strength and high toughness which have never been achieved before, through a combination of a given proportion of aggregate of a cementitious matrix and an asperity pattern on the surface of each fiber having asperities 1. Moreover, preparing that combination does not require mixing special expensive materials; it only requires selecting and using conventionally used materials and is therefore economical.

In other words, the ultra-high-strength fiber reinforced concrete of the embodiment is characterized by specifying the parts by weight and the mean particle diameter of the aggregate of the cementitious matrix and, as for the fiber having asperities 1, by not specifying the material thereof but only by specifying the asperity pattern on the surface.

Moreover, the tensile strength of the ultra-high-strength fiber reinforced concrete is enhanced because the bond resistance stress between the fiber having asperities 1 and the cementitious matrix is improved significantly. Furthermore, the enhancement in toughness can be explained by the fact that the bond resistance stress between the fiber having asperities 1 and the cementitious matrix does not decrease for the total length in which the cementitious matrix and the fiber having asperities 1 are in contact (or bonding) even when detachment of some fibers increases. Therefore, the ultra-high-strength fiber reinforced concrete having high toughness and flexural strength has been achieved by the combination of an appropriate asperity pattern on the fiber surface and appropriate parts by weight of the aggregate contained in the cementitious matrix.

While an embodiment and examples of the present invention have been described in detail above with reference to the drawings, the specific configuration is not limited to the embodiment or the examples, and the present invention encompasses design changes without departing from the gist of the present invention.

CROSS-REFERENCE TO RELATE APPLICATION

This application is based upon and claims the benefit of priority from Japanese Patent Application No. 2011-250320 filed on Nov. 16, 2011 in the Japan Patent Office and Japanese Patent Application No. 2012-182081 filed on Aug. 21, 2012 in the Japan Patent Office, the disclosure of which is incorporated herein in its entirety by reference.

EXPLANATION OF THE REFERENCE NUMERALS 1 fiber having asperities
11 recessed portion
12 raised portion
2 aggregate
h depth
H smallest cross-sectional diameter
P pitch
B largest cross-sectional diameter

The invention claimed is:

1. A fiber reinforced cement based mixed material comprising:
   100 parts by weight of cement,
   5 to 30 parts by weight of silica fume,
   35 to 80 parts by weight of at least one pozzolanic material excluding the silica fume,
   5 to 25 parts by weight of limestone powder,
   at least one chemical admixture,
   water,
   70 to 150 parts by weight of aggregate having a largest aggregate diameter of 1.2 to 3.5 mm and wherein a mean particle diameter of the aggregate particles of 0.2 to 0.8 mm, and
   fibers,
   wherein at least some of the fibers comprise a fiber having asperities formed in a surface thereof, the fiber having asperities being formed such that a ratio (h/H) of a depth h of each of recessed portions among the asperities to a smallest cross-sectional diameter H thereof is 0.05 to 0.8,
   wherein the Blaine specific surface area of the limestone powder is not less than 3,000 $cm^2$/g, and
   wherein the sum content of (1) the limestone powder and (2) the at least one pozzolanic material excluding the silica fume is 57 to 88 parts by weight.

2. The fiber reinforced cement based mixed material according to claim 1, wherein the fibers having asperities are each formed such that a ratio (p/B) of a pitch p of the recessed portions among the asperities in a longitudinal direction of the fiber having asperities to a largest cross-sectional diameter B thereof is 0.3 to 10.0.

3. The fiber reinforced cement based mixed material according to claim 1, wherein a length Li of each of the fibers is such that a ratio (Li/d) thereof to a mean cross-sectional diameter d is 10 to 500.

4. The fiber reinforced cement based mixed material according to claim 1, wherein a total volume mixing ratio of the fibers is 0.7 to 8%.

5. The fiber reinforced cement based mixed material according to claim 2, wherein a length Li of each of the fibers is such that a ratio (Li/d) thereof to a mean cross-sectional diameter d is 10 to 500.

6. The fiber reinforced cement based mixed material according to claim 2, wherein a total volume mixing ratio of the fibers is 0.7 to 8%.

7. The fiber reinforced cement based mixed material according to claim 3, wherein a total volume mixing ratio of the fibers is 0.7 to 8%.

8. The fiber reinforced cement based mixed material according to claim 5, wherein a total volume mixing ratio of the fibers is 0.7 to 8%.

* * * * *